(No Model.) 10 Sheets—Sheet 3.
C. HOLLY.
LOOPING MACHINE.
No. 593,218. Patented Nov. 9, 1897.
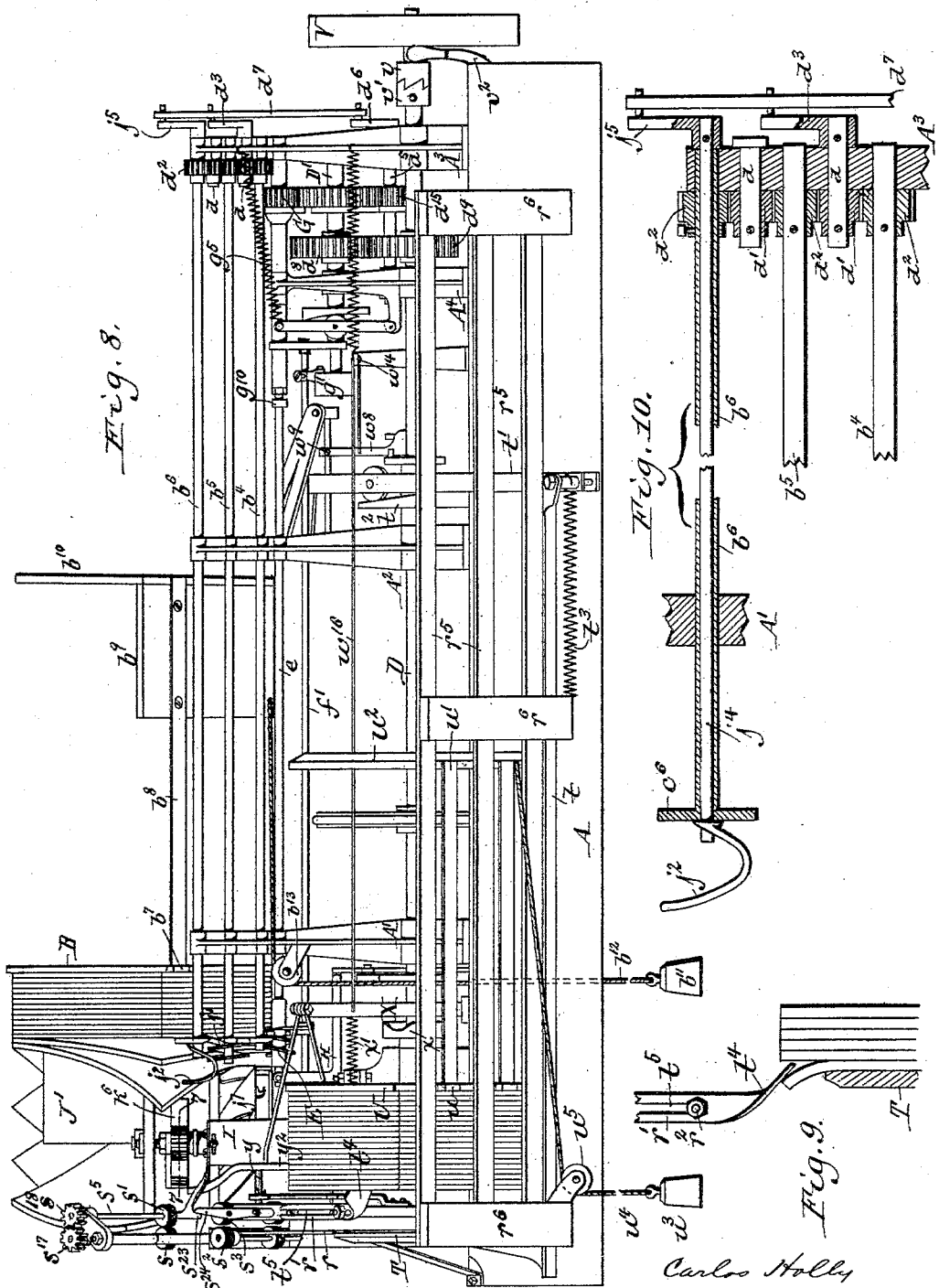
Witnesses: Ernest Pulsford, Theo. L. Popp
Carlos Holly, Inventor
By Wilhelm Bonner, Attorneys (No Model.) 10 Sheets—Sheet 4.
C. HOLLY.
LOOPING MACHINE.
No. 593,218. Patented Nov. 9, 1897.
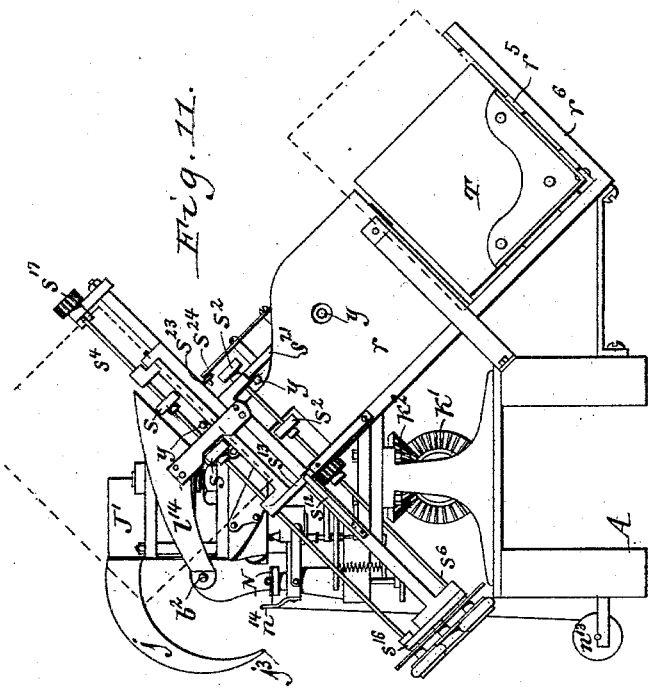
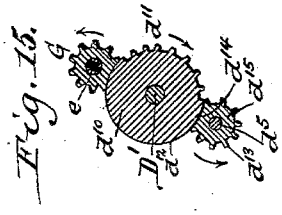
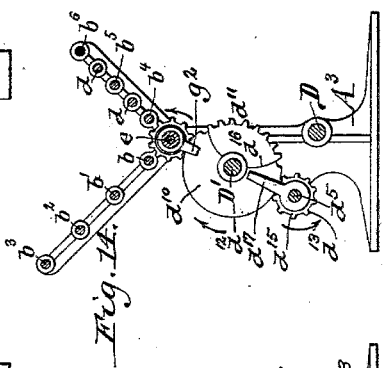
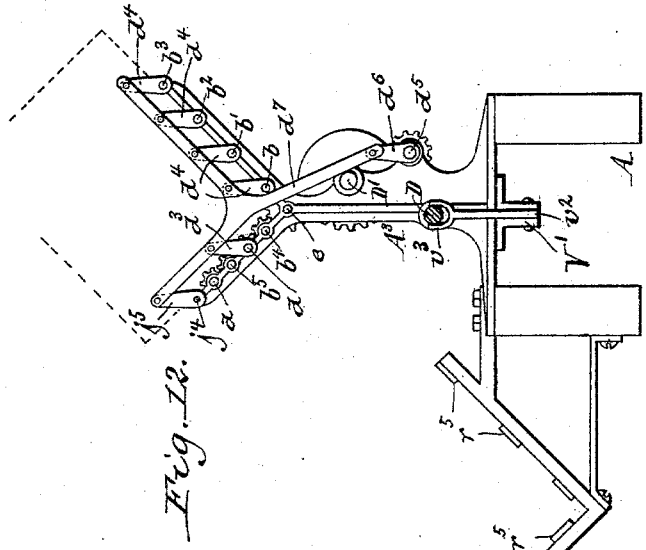
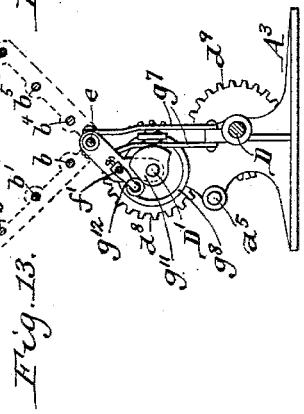
Witnesses:
Ernest Pulsford.
Theo. L. Popp.
Carlos Holly, Inventor.
By Wilhelm Bonner,
Attorneys.

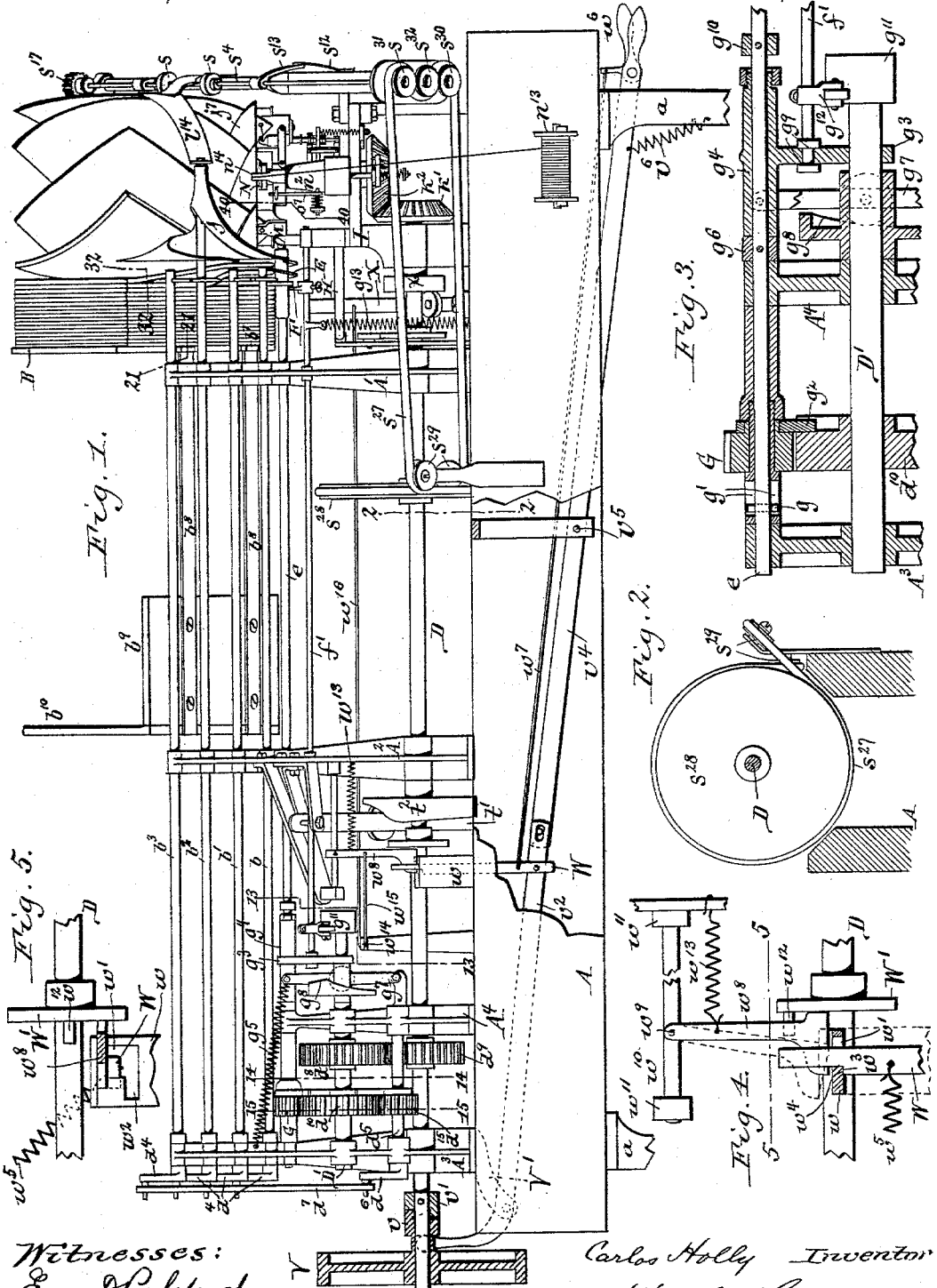

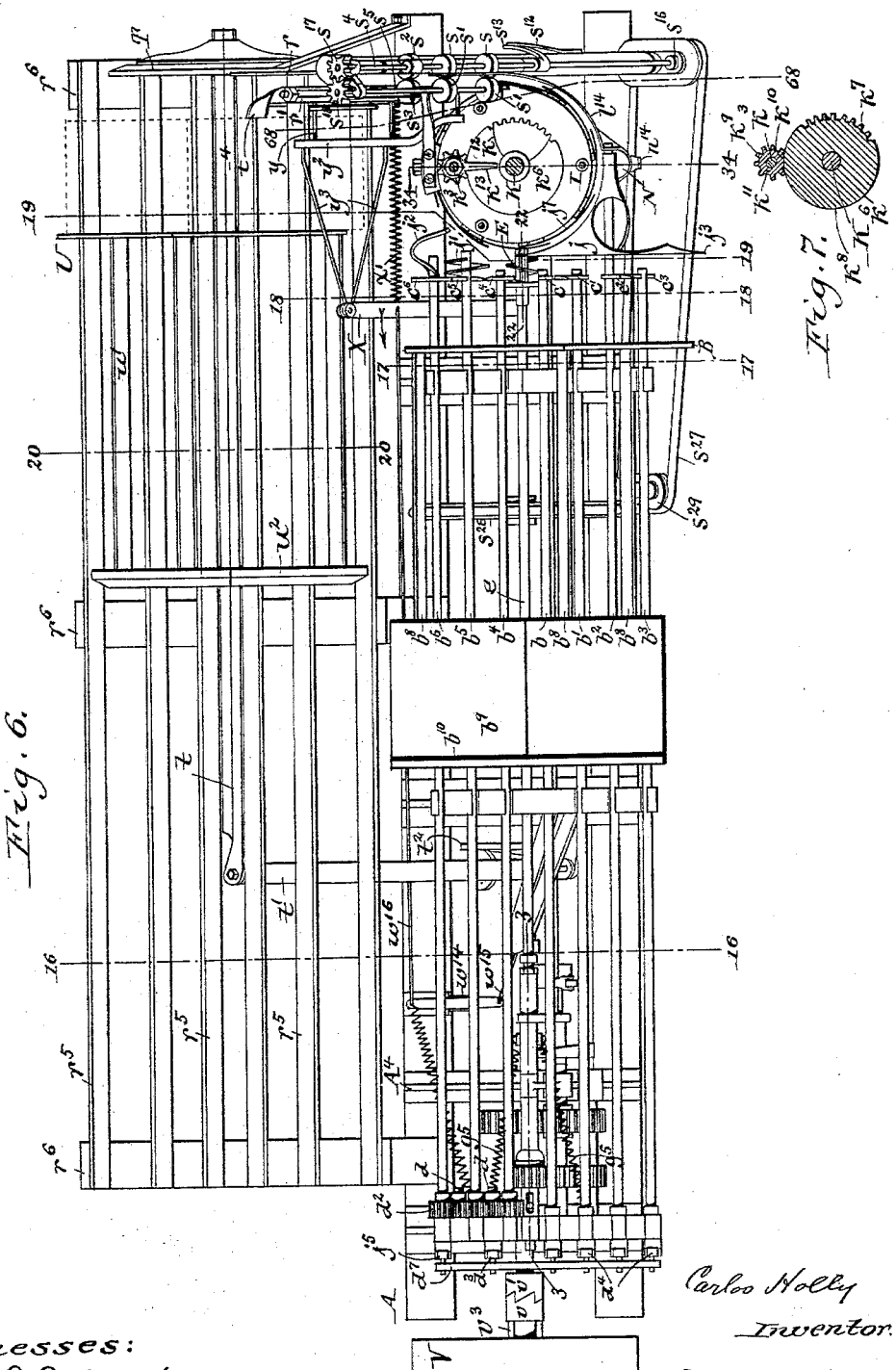

(No Model.) 10 Sheets—Sheet 5.
C. HOLLY.
LOOPING MACHINE.
No. 593,218. Patented Nov. 9, 1897.
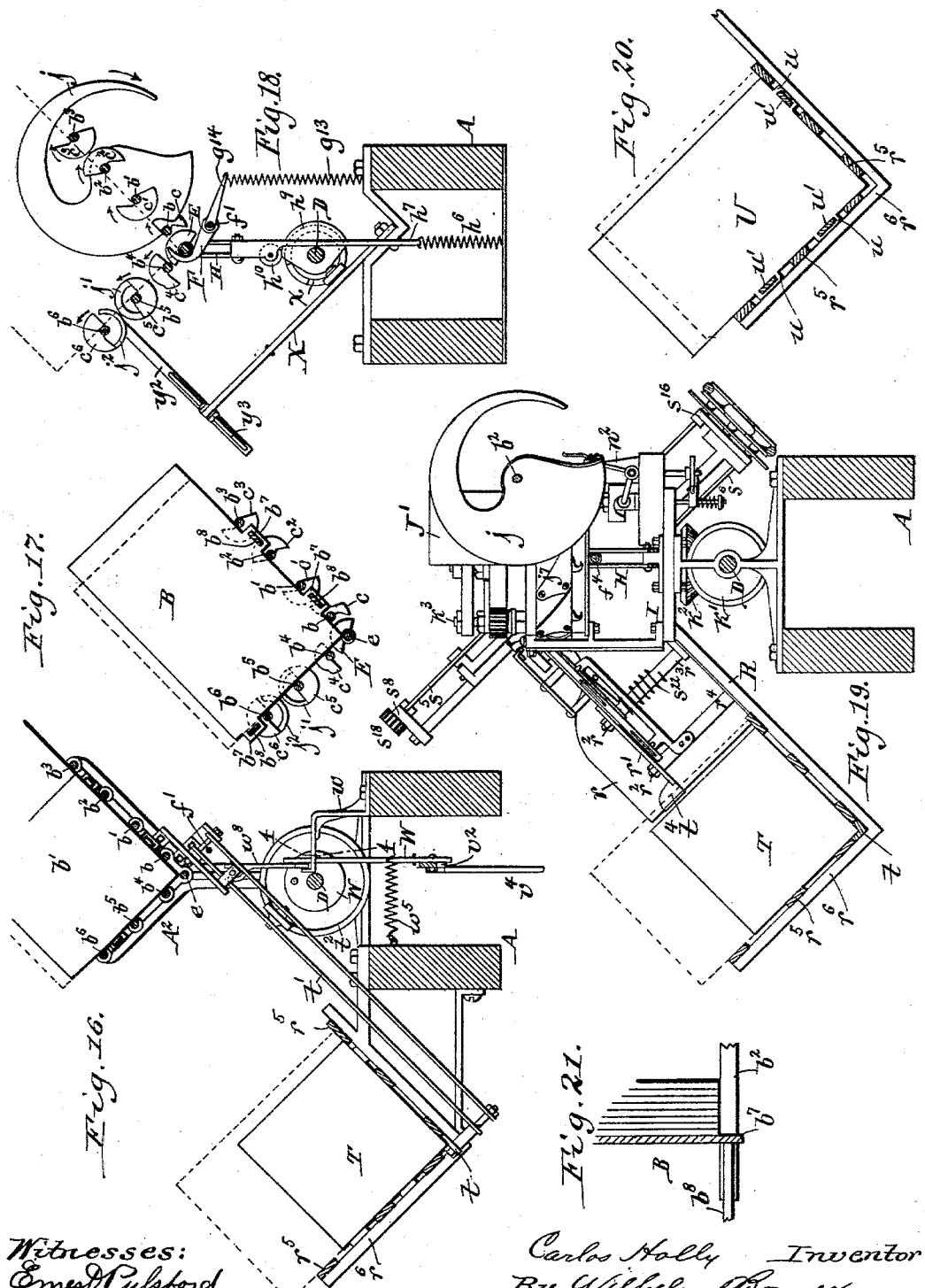
Witnesses: Carlos Holly Inventor
Ernest Pulsford. By Wilhelm Bonner
Theo. L. Popp Attorneys.

(No Model.) 10 Sheets—Sheet 6.
C. HOLLY.
LOOPING MACHINE.
No. 593,218. Patented Nov. 9, 1897.
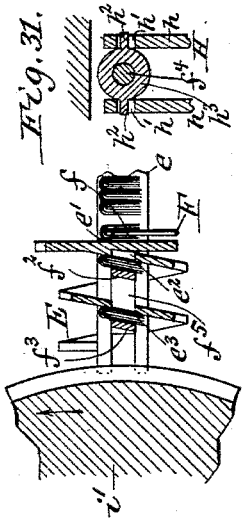
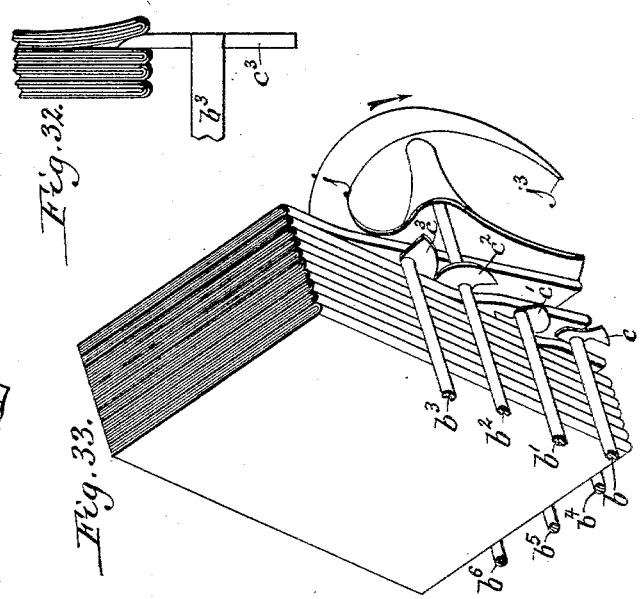
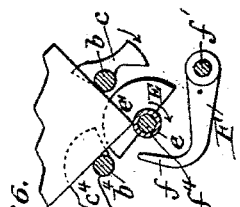
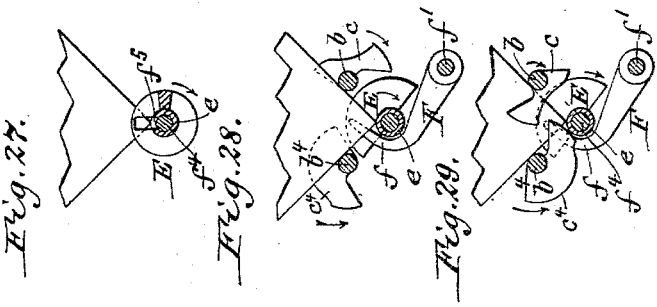
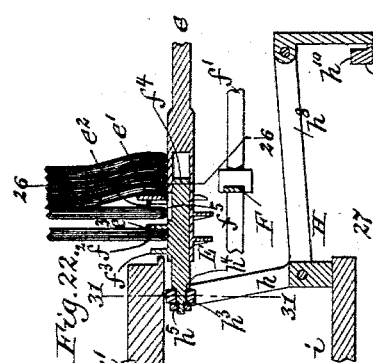
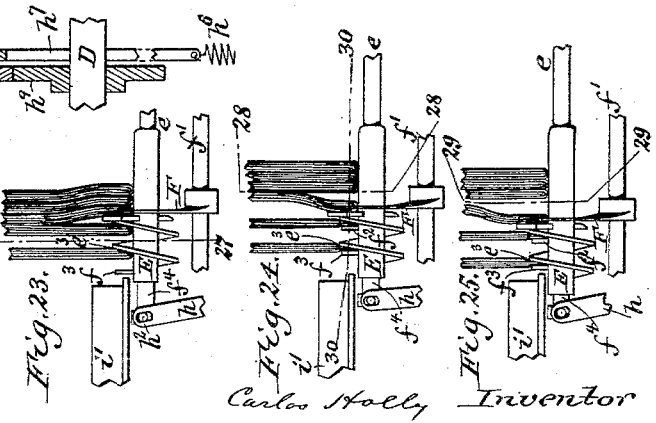
Witnesses:
Ernest Pulaford.
Theo. L. Popp.
Carlos Holly, Inventor
By Wilhelm Bonner
Attorneys.

(No Model.) 10 Sheets—Sheet 7.
C. HOLLY.
LOOPING MACHINE.
No. 593,218. Patented Nov. 9, 1897.
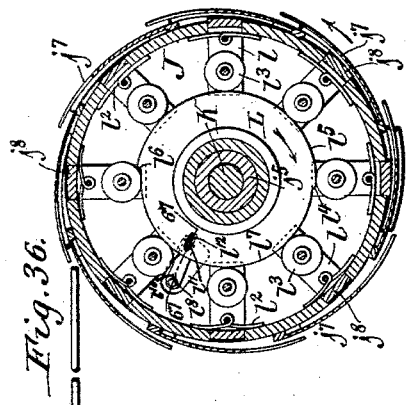
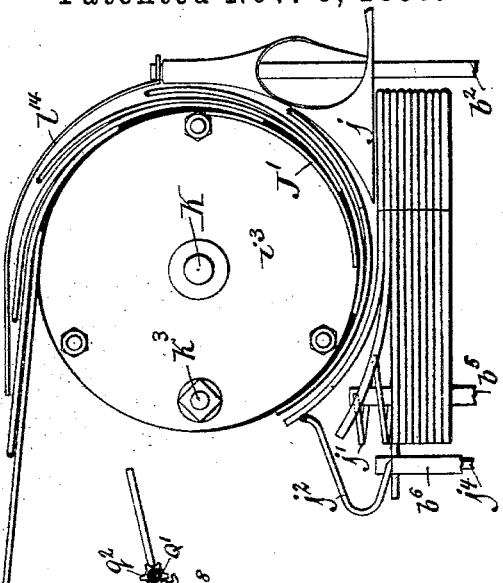
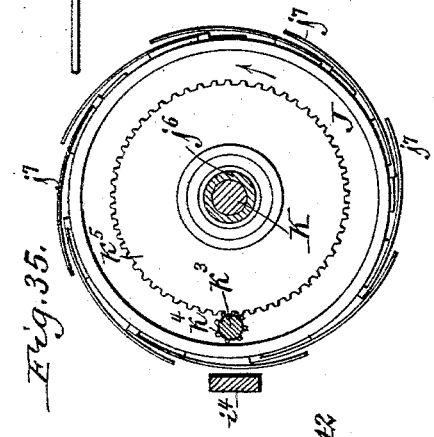
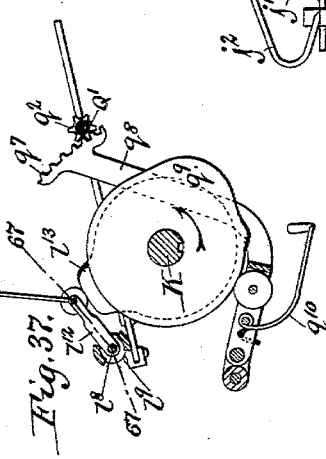
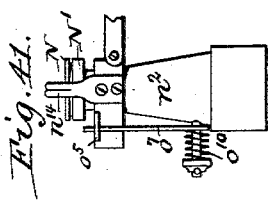
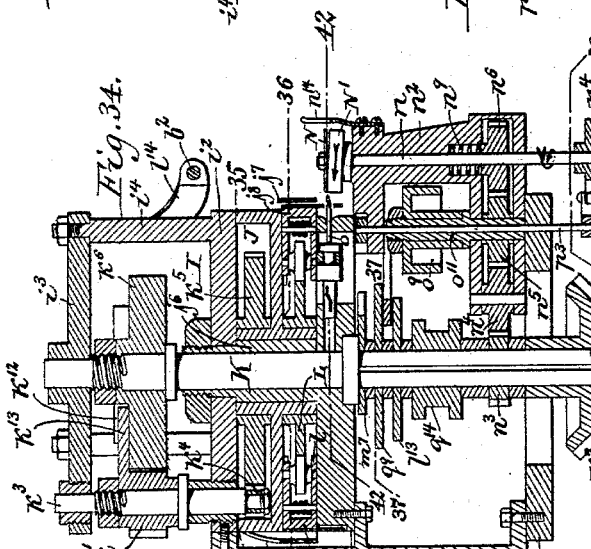
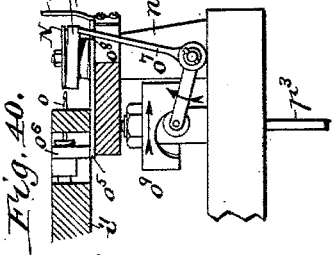
Witnesses.
Eme D. Pulford.
Theo. L. Popp.
Carlos Holly, Inventor
By Wilhelm Bonner
Attorneys.
THE NORRIS PETERS CO., PHOTO-LITHO., WASHINGTON, D. C.

(No Model.) 10 Sheets—Sheet 8.
C. HOLLY.
LOOPING MACHINE.
No. 593,218. Patented Nov. 9, 1897.
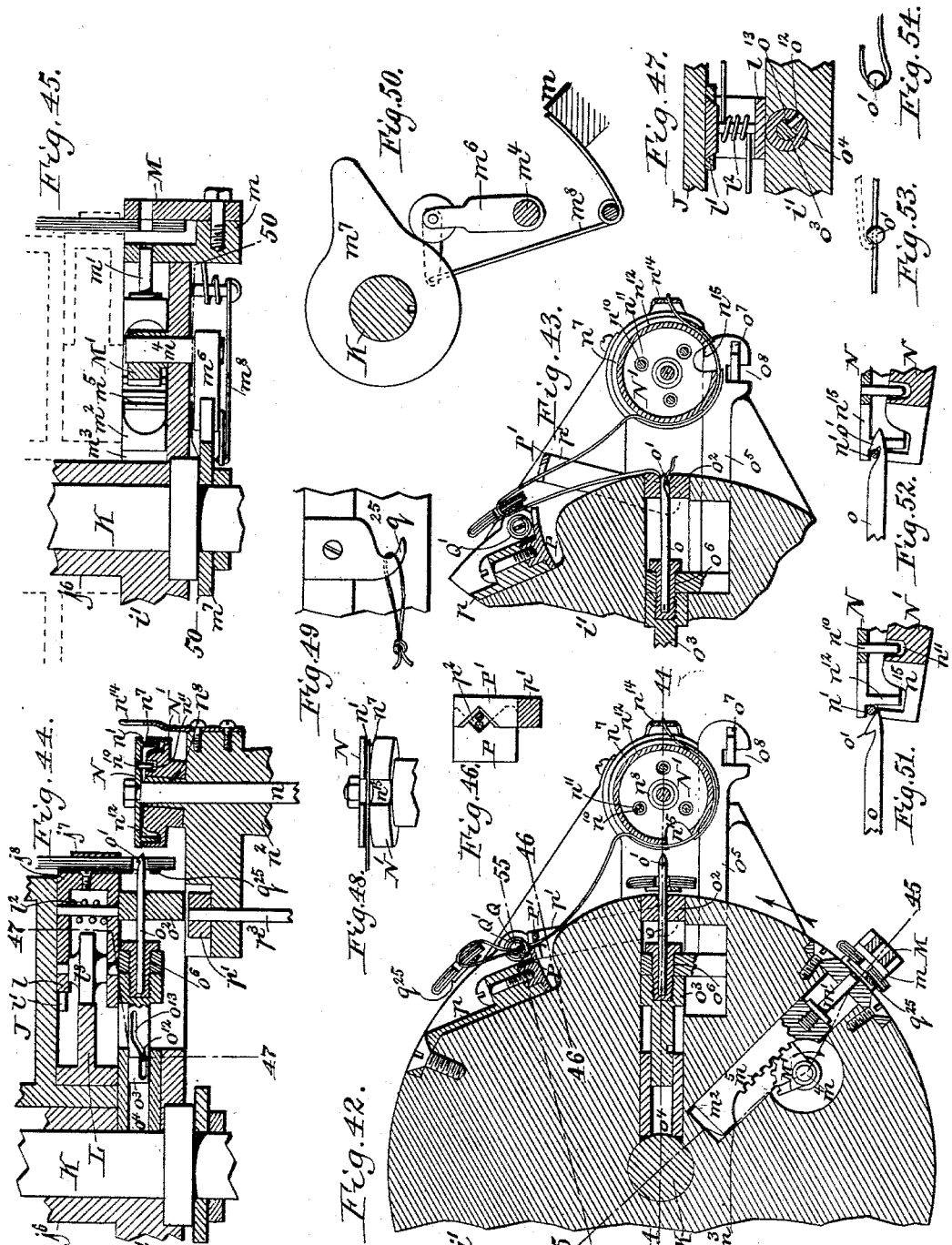

(No Model.) 10 Sheets—Sheet 9.
C. HOLLY.
LOOPING MACHINE.
No. 593,218. Patented Nov. 9, 1897.
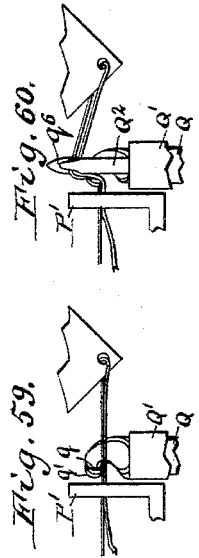
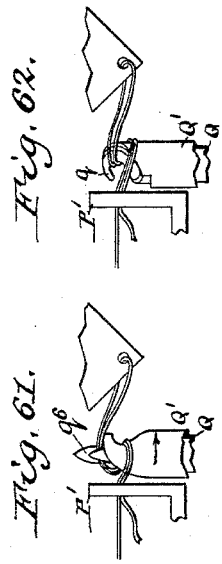
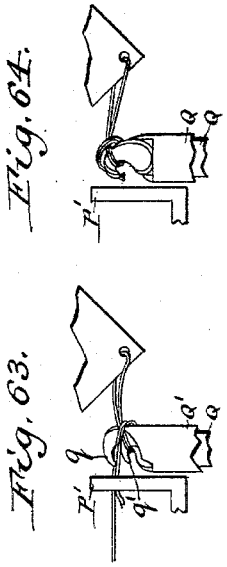
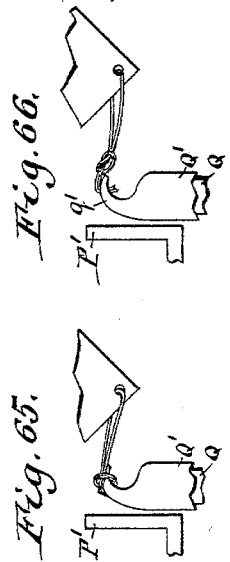
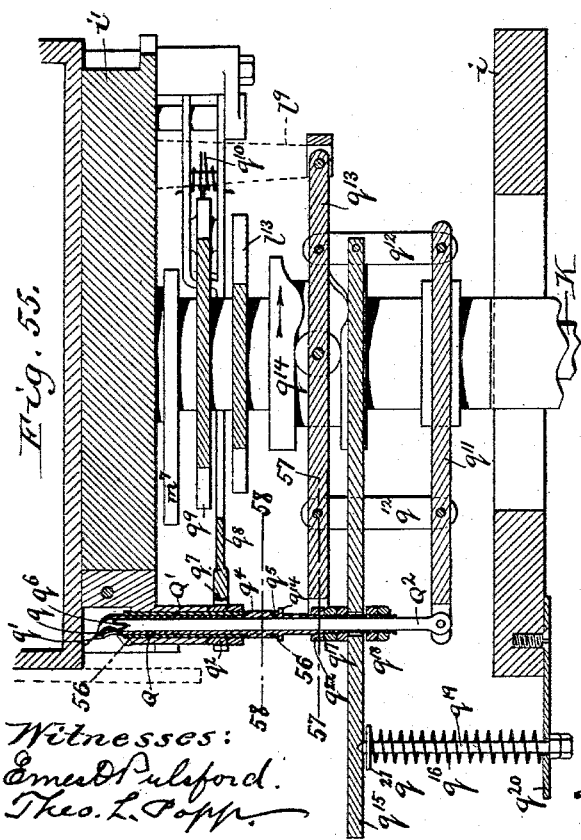
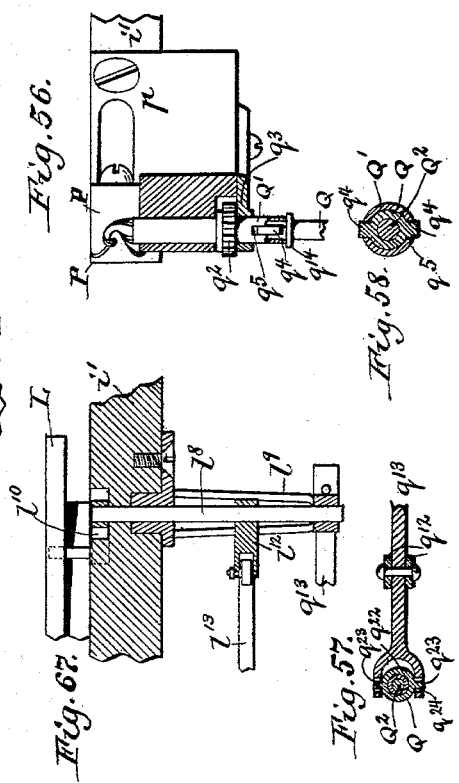
Witnesses:
Ernest Pulsford.
Theo. L. Popp.
Carlos Holly, Inventor
By Wilhelm Bonner
Attorneys.

(No Model.) 10 Sheets—Sheet 10.
C. HOLLY.
LOOPING MACHINE.
No. 593,218. Patented Nov. 9, 1897.
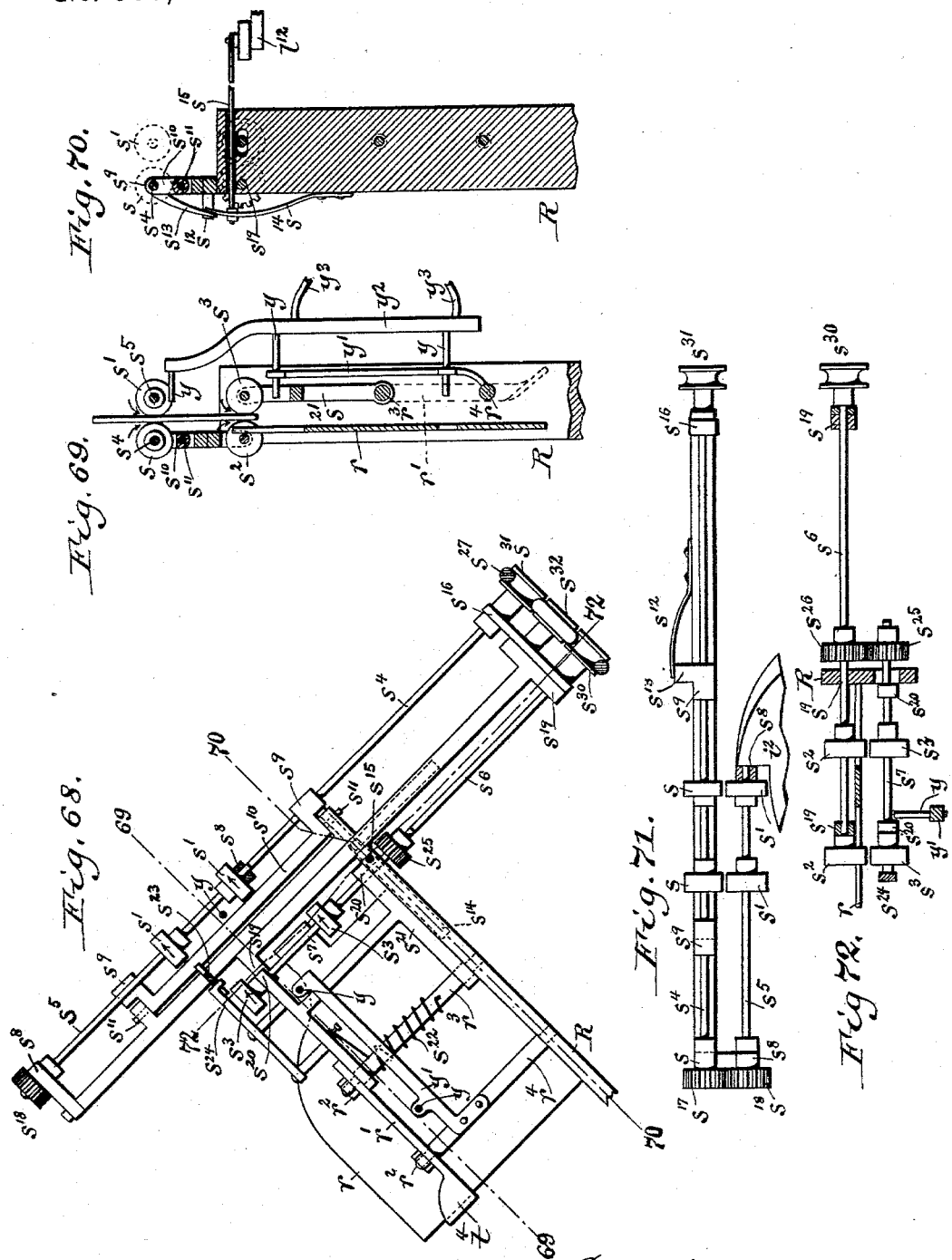
Witnesses:
Ernest Pulsford.
Theo. L. Popp.
Carlos Holly, Inventor.
By Wilhelm Bonner
Attorneys

UNITED STATES PATENT OFFICE.

CARLOS HOLLY, OF LOCKPORT, NEW YORK, ASSIGNOR TO JOSEPH A. WARD AND JOHN McLEAN, OF SAME PLACE.

LOOPING-MACHINE.

SPECIFICATION forming part of Letters Patent No. 593,218, dated November 9, 1897.

Application filed January 11, 1897. Serial No. 618,850. (No model.)

*To all whom it may concern:*

Be it known that I, CARLOS HOLLY, a citizen of the United States, residing at Lockport, in the county of Niagara and State of New York, have invented new and useful Improvements in Looping-Machines, of which the following is a specification.

This invention relates to a machine for attaching hangers or loops of string or twine to books, pamphlets, or other blanks, and has the object to produce an automatic machine for this purpose whereby the blanks are fed successively from a pile or stack and are perforated, threaded, and knotted and then gathered in a pile or stack in a reliable and expeditious manner.

In the looping-machine which forms the subject of this application the pamphlets or other blanks are placed side by side, with one corner downward, in an angular feed-trough and are then separated successively at the front end of the pile or stack and fed against the side of a vertical drum which rotates intermittently about a vertical axis and which is provided on its cylindrical face with jaws by which the blanks are clamped to the drum. The latter presents the pamphlets, during its rotation, successively to mechanisms whereby each blank is perforated and whereby the twine is drawn through the perforation, looped, tied, and cut off. The looped blanks are discharged one after the other from the drum and stacked in a receiving-trough, from which they are removed from time to time.

In the accompanying drawings, consisting of ten sheets, Figure 1 is a front elevation of my improved pamphlet looping-machine, partly in section. Fig. 2 is a transverse section thereof in line 2 2, Fig. 1. Fig. 3 is a fragmentary longitudinal sectional elevation, on an enlarged scale, in line 3 3, Fig. 6. Fig. 4 is a fragmentary longitudinal sectional elevation, on an enlarged scale, in line 4 4, Fig. 16. Fig. 5 is a horizontal section in line 5 5, Fig. 4. Fig. 6 is a top plan view of the machine, partly in section. Fig. 7 is a horizontal section in line 7 7, Fig. 8. Fig. 8 is a rear elevation of the machine. Fig. 9 is a fragmentary sectional view, on an enlarged scale, showing the operation of the packer and detent on the blanks. Fig. 10 is a fragmentary longitudinal section, on an enlarged scale, showing the means for driving the blank-supporting shafts on one side of the feed-trough and one of the rear wrapping-screws. Fig. 11 is an elevation of the front end of the machine. Fig. 12 is an elevation of the rear end of the machine, partly in section. Figs. 13, 14, and 15 are transverse sections in lines 13 13, 14 14, and 15 15, Fig. 1, respectively. Figs. 16, 17, 18, 19, and 20 are transverse sections in lines 16 16, 17 17, 18 18, 19 19, and 20 20, Fig. 6, respectively. Fig. 21 is a fragmentary longitudinal section, on an enlarged scale, in line 21 21, Fig. 1. Fig. 22 is a vertical longitudinal sectional elevation, on an enlarged scale, of the blank-conveyer and connecting parts, in line 22 22, Fig. 6. Figs. 23, 24, and 25 are fragmentary rear elevations of the conveyer-screw and adjacent parts, showing different positions of the parts. Figs. 26, 27, 28, and 29 are vertical cross-sections in lines 26 26, 27 27, 28 28, and 29 29, Figs. 22, 23, 24, and 25, respectively. Fig. 30 is a fragmentary horizontal section, on an enlarged scale, in line 30 30, Fig. 24. Fig. 31 is a vertical section, on an enlarged scale, in line 31 31, Fig. 22. Fig. 32 is a longitudinal section, on an enlarged scale, in line 32 32, Fig. 1. Fig. 33 is a perspective view showing the manner in which the rotary blades separate the blanks from the pile. Fig. 34 is a transverse section, on an enlarged scale, in line 34 34, Fig. 6. Figs. 35, 36, 37, and 38 are horizontal sections in lines 35 35, 36 36, 37 37, and 38 38, Fig. 34, respectively. Fig. 39 is a top plan view, on an enlarged scale, of the carrier-drum and adjacent parts. Fig. 40 is a fragmentary vertical section, on an enlarged scale, in line 40 40, Fig. 1. Fig. 41 is a fragmentary front view, on an enlarged scale, of the threading device. Fig. 42 is a fragmentary horizontal section, on an enlarged scale, in line 42 42, Fig. 34. Fig. 43 is a similar view showing the parts in a different position. Figs. 44, 45, and 46 are fragmentary vertical sections in lines 44 44, 45 45, and 46 46, Fig. 42, respectively. Fig. 47 is a fragmentary vertical section in line 47 47, Fig. 44. Fig. 48 is an inside elevation of the twine-feeding device on the same scale as Fig. 44. Fig. 49 is a detached view of one of the twine-clearing hooks or fingers. Fig. 50 is a horizontal section in line 50 50, Fig. 45. Figs. 51 and 52 are fragmentary sectional views, on an enlarged scale, showing two different longitudinal positions of the threading hook or needle. Figs. 53 and 54 are end views of the threading hook or needle, showing the same in different rotary positions. Fig. 55 is a fragmentary cross-section, on an enlarged scale, in line 55 55, Fig. 42. Fig. 56 is a fragmentary vertical section in line 56 56, Fig. 55. Figs. 57 and 58 are horizontal sections, on an enlarged scale, in lines 57 57 and 58 58, Fig. 55, respectively. Figs. 59, 60, 61, 62, 63, 64, 65, and 66 are fragmentary views showing different positions of the knotter in the operation of tying a knot in the loop or hanger. Fig. 67 is a fragmentary vertical section, on an enlarged scale, in line 67 67, Figs. 36 and 37, showing the mechanism for operating the blank-holding clamp of the carrier-drum. Fig. 68 is a fragmentary transverse section, on an enlarged scale, in line 68 68, Fig. 6, showing the blank-transferring mechanism from the inner side. Figs. 69 and 70 are longitudinal sections in lines 69 69 and 70 70, Fig. 68, respectively. Fig. 71 is a top view of the blank-transferring mechanism. Fig. 72 is a transverse section in line 72 72, Fig. 68.

Like letters of reference refer to like parts in the several figures.

The main frame of the machine consists, essentially, of an open bed A, provided with legs $a$, and three main standards $A'$ $A^2$ $A^3$, secured, respectively, to the front, intermediate, and rear portions of the bed.

$b$ $b'$ $b^2$ $b^3$ $b^4$ $b^5$ $b^6$, Figs. 1, 6, 8, 10, 12, 13, 14, 16, 17, 18, and 33, represent longitudinal supporting shafts or rods which are arranged in two downwardly-converging sets to form a V-shaped feed-trough or receptacle. The pamphlets, which I will call "blanks" for the sake of brevity, are placed upside down and side by side in the trough with their backs or folded ends against the set of shafts $b$ $b'$ $b^2$ $b^3$, which form the oblique front side of the feed-trough, and with their upper ends against the set of shafts $b^4$ $b^5$ $b^6$, which form the oblique rear side of the feed-trough. These shafts are journaled in bearings formed in the upper V-shaped portions of the standards $A'$ $A^2$ $A^3$, and are rotated and form rolling supporting-surfaces for the blanks, which enable the latter to be readily moved lengthwise through the trough.

B, Figs. 1, 6, 8, 17, and 21, represents a follower which bears against the back of the pile or stack of blanks in the feed-trough and which is provided on opposite sides with lugs $b^7$, which project outwardly between the adjacent trough-shafts.

$b^8$ are horizontal follower-bars bearing with their front ends against the lugs of the follower and secured with their rear ends to a cross-head composed of a V-shaped body $b^9$, which slides in the trough, and an end board $b^{10}$, secured to the rear end of the body. These bars are arranged between the feed-trough shafts and below or outside of the supporting-surfaces thereof, Figs. 17 and 21, so that these bars will not interfere with the blanks in the trough. The cross-head, follower-bars, follower, and blanks are constantly pressed forward by any suitable means, preferably by a weight $b^{11}$ and a cord $b^{12}$ connecting the weight with the cross-head and passing around a roller $b^{13}$, mounted on the front standard $A'$, as shown in Fig. 8. When the pile of blanks requires replenishing, an additional lot of blanks is placed in the trough against the back of the follower which is in use and another follower of the same construction is placed behind the new lot of blanks, after which the follower-bars, together with the cross-head, are drawn rearwardly and engaged with the lugs of the rear follower. The front follower is then removed. This follower mechanism permits of easily and readily renewing the supply of blanks without stopping the machine or disarranging any of the blanks which have previously been placed in the feed-trough.

$c$ $c'$ $c^2$ $c^3$ $c^4$ $c^5$ $c^6$, Figs. 1, 6, 8, 17, 18, and 33, represent two sets of rotary separating and supporting wings or blades which are secured to the front ends of the feed-trough shafts and which serve as an abutment against which the front of the pile of blanks rests and also as separators whereby the foremost blanks of the pile are separated from the remainder. The blades $c$ $c'$ $c^2$ $c^3$, forming one set, are secured, respectively, to the front ends of the trough-shafts $b$ $b'$ $b^2$ $b^3$, and form an abutment for the backs of the blanks. The blades $c^4$, $c^5$, and $c^6$, forming the other set, are secured, respectively, to the front ends of the trough-shafts $b^4$, $b^5$, and $b^6$ and serve as an abutment for the upper inverted ends of the blanks. The blades of both sets are arranged in the same transverse vertical plane, Fig. 6, and each blade has substantially the form of a semicircular wedge, the front or advancing edge thereof being sharp, while its rear or trailing end is comparatively thick and ends abruptly, as represented in Fig. 32. These separating-blades rotate with their inner portions upwardly, as indicated by the arrows, Fig. 18, and the relative arrangement of the blades on the shafts is such that the blades of each set operate upon each blank successively and the blades of both sets operate upon each blank alternately. The lowermost blade $c$ of the front set first enters between the lower portions of two blanks and passes upwardly between the same, whereby the lower portion of the foremost blank of the two is moved forwardly and away from the next following blank by the wedge action of the gradually-thickening body of the blade. Before the rear end of the lowermost blade $c$ has cleared these blanks the sharp front end of the lowermost blade $c^4$ of the rear set, following behind the thick rear end of the lowermost blade of the front set, enters the gap which has been formed between these blanks and in moving upwardly separates the same further. When this blade has nearly cleared the rear side of these blanks, the next higher blade $c'$ of the front set enters the gap in like manner and extends the separation of the blanks upwardly. The remaining blades $c^5$, $c^2$, $c^6$, and $c^3$ of the two sets then follow each other alternately in the order named. Each of said blades enters the gap between the blanks as the next lower blade is about to leave the blanks and then effects a further upward separation of the blanks. When the uppermost blade has passed between the two blanks, the separation between the same is completed from the lower ends to the upper ends of the same. The relative timing of the separating-blades is such that while the upper blades are passing between the first and second blank of the pile the intermediate separating-blades are passing between the second and third blanks and lowermost blades are separating the third and fourth blanks, so that when the machine is in full operation three blanks are being separated simultaneously from the pile in different stages of completeness. When all of the separating-blades have made one rotation, the combined effect is equal to separating one blank completely from the pile, after which the movement of the blades is arrested until the foremost blank has been carried away by mechanism hereinafter described. This intermittent rotary movement of the separating-blades is preferably effected as follows:

$d$, Figs. 6, 8, and 10, represents horizontal spindles which are journaled in the rear standard $A^3$, and which are provided with gear-pinions $d'$, meshing with gear-pinions $d^2$ on the adjacent rear feed-trough shafts $b^4$, $b^5$, and $b^6$.

$d^3$, Figs. 6, 8, 10, and 12, is a crank arranged on the rear end of one of the spindles, and $d^4$ are similar cranks arranged on the rear ends of the front feed-trough shafts $b$ $b'$ $b^2$ $b^3$.

$d^5$ is an intermittently-rotating crank-shaft which is journaled in the rear main standard $A^3$ and a short standard $A^4$, arranged on the bed, and which is provided on its rear end with a crank $d^6$ of the same length as the cranks $d^3$ $d^4$.

$d^7$ is a bifurcated yoke or rod which connects the actuating-crank $d^6$ with the two sets of driven cranks of the shafts and whereby these parts are caused to rotate intermittently in unison.

D, Figs. 1, 2, 6, 8, 13, and 14, is the continuously-rotating main driving-shaft, which is journaled lengthwise underneath the feed-trough in bearings arranged on the standards, and D' is a counter-shaft journaled in bearings on the rear standard $A^3$ and the short standard $A^4$. The counter-shaft is driven from the main shaft at the same speed as the latter by gear-wheels $d^8$ $d^9$, secured, respectively, to these shafts. An intermittent rotary movement is transmitted from the counter-shaft to the crank-shaft $d^5$ by a driving gear-wheel $d^{10}$, secured to the counter-shaft and provided on its periphery with a segmental row of gear-teeth $d^{11}$, Figs. 14 and 15, and a convex face $d^{12}$, adapted to engage, respectively, with the teeth $d^{13}$ and concave face $d^{14}$ of an intermediate mutilated gear-pinion $d^{15}$, secured to the crank-shaft $d^5$. The pinion is held at rest while the convex face of the driving-wheel is in engagement with the concave face of the pinion; but when the teeth of the latter are engaged by the teeth of the driving-wheel the pinion is turned in the direction of the arrow, Figs. 14 and 15, the number of teeth on the wheel and pinion being so proportioned that the pinion makes one rotation during each rotation of the driving-wheel. The teeth of the driving-wheel are compelled to engage gradually at the proper time with the teeth of the pinion by a shoulder $d^{16}$, formed on the driving gear-wheel and engaging with an arm $d^{17}$ on the pinion.

In order to enable the lowermost separating-blade $c$ to pass positively and reliably between the lower portions of two contiguous blanks and for the purpose of aiding the blades in feeding off the blanks a preliminary separating and feeding device is provided, which is constructed as follows:

E, Figs. 1, 6, 8, 17, 18, 22 to 30, represents a main feeding screw or conveyer whereby the lower portions of the partially-separated blanks in the feed-trough are carried forwardly from the unseparated portion of the pile to the mechanism which carries the blanks to the perforating, threading, and tying mechanisms. This conveyer is arranged lengthwise below the delivery end of the feed-trough and is mounted on the front end of a longitudinal shaft $e$, which is journaled in bearings in the adjacent stationary parts of the machine, so as to be capable of both a rotary and a longitudinally-reciprocating movement.

The feed-conveyer consists, preferably, of two convolutions, so as to present three clamping jaws or faces $e'$ $e^2$ $e^3$, which are arranged in a longitudinal row along the upper side of the conveyer, and are formed, respectively, by the rear side of the first convolution of the conveyer, the front side of the first convolution and the front side of the second convolution, as shown in Figs. 22, 23, 24, 25, and 30.

The rear end of the conveyer is preferably made of the same form as the intermediate separator-blades and is arranged parallel therewith, so that the rear jaw $e'$ is arranged at right angles to the axis of the conveyer, while the intermediate and front jaws are arranged at an angle thereto.

F represents a separating and clamping finger whereby the foremost blank is separated at its lower corner from the pile and pressed against the rear jaw $e'$ of the conveyer, Figs. 22 to 30. This finger is arranged below the front portion of the pile and has its end curved to form a bent jaw or hook $f$. This finger is secured to the front portion of a shaft $f'$, which is journaled lengthwise under the feed-trough in bearings on the adjacent stationary parts of the machine, so as to be capable of both a rocking and a longitudinal reciprocating movement.

$f^2$ $f^3$ represent two clamping-jaws which are arranged to face the front sides of the first and second convolutions of the conveyer-screw, and whereby the blanks are successively held against the jaws $e^2$ $e^3$ of the conveyer-screw. These clamping-jaws are moved toward and from the conveyer-jaws by a sliding rod $f^4$, which is arranged in the tubular front portion of the conveyer-shaft. The clamping-jaws $f^2$ $f^3$ project laterally through a longitudinal slot $f^5$ in the tubular shaft. The clamping-jaws $f^2$ $f^3$ are arranged at the same angle as the convolutions of the conveyer, against which they press the blanks, and are preferably formed by cutting them out of the conveyer, as represented in Figs. 22, 27, and 30.

Preparatory to separating the lower corner of a blank from the pile the conveyer-shaft is moved rearwardly to its fullest extent, whereby the rear jaw $e'$ of the conveyer is pressed against the foremost blank of the pile and the latter is compacted at the lower corner. The finger-shaft has been shifted to its most rearward position, in which the separating-finger stands with its hook opposite the lower portion of the foremost blank, as represented in Figs. 22 and 26. While the lower corner of the pile is held in this compressed condition by the rear jaw $e'$ of the screw conveyer, the separating-finger is turned so as to enter between the leaves of the foremost blank near the back thereof, and is then moved forward toward the rear jaw of the conveyer, whereby the part of the blank at the lower corner thereof is clamped between the rear jaw of the screw conveyer and the finger, as represented in Fig. 23. By thus pressing the rear jaw of the screw conveyer against the lower corner of the pile the location of the first blank is always the same, and the place where the finger engages between the leaves of the blank is definitely determined, regardless of the thickness of the blanks, whereby the missing of a blank is positively avoided. After the blank has been clamped between the conveyer and the finger the shafts carrying these parts are moved forwardly together to the end of their forward stroke, whereby the lower corner of the foremost blank is separated from the succeeding blank and a gap is formed between the same. As soon as this gap has been formed the lowermost separating-blade $c$ enters the same and starts the upward separation of these blanks at the lower corner of the same, which operation is continued upwardly, as hereinbefore described.

When the separating-blades have finished separating the lower portion of the foremost blank from the second blank, the separating-finger is withdrawn from the first blank. The conveyer shaft and screw now move backward, and after the initial portion of this longitudinal movement the screw makes one complete turn in the direction of the arrow, Figs. 26 to 29, whereby the rear end of the conveyer passes behind the first blank, after which the conveyer stops turning and is pressed against the front side of the lower corner of the second blank at the end of its backward movement preparatory to engaging the same by the separating-finger, which latter has in the meantime also been moved backwardly to the place where it is inserted into the blanks. While the separating-finger is holding the second blank against the rear jaw of the conveyer during the next forward movement of the finger-shaft the first blank is clamped against the intermediate jaw $e^2$ of the conveyer by the jaw $f^2$, whereby the first and second blanks are carried forward simultaneously. When the second blank has been separated at its lower end from the third blank of the pile by the separating-blades, the first and second blanks are released from the intermediate and rear clamps and the conveyer in the course of its backward movement again makes one turn, whereby the first blank is carried in front of the front jaw of the conveyer, the second blank is carried in front of the intermediate jaw of the conveyer, and at the end of the backward movement of the conveyer its rear jaw bears against the front side of the third blank. During the next longitudinal forward movement of the conveyer the first blank is clamped between the front jaw $e^3$ of the conveyer and the front sliding jaw $f^3$ and presented to the mechanism which carries the blanks to the looping mechanism, the second blank is held by the intermediate pair of clamping-jaws, and the third blank is held between the rear jaw of the conveyer and the finger which constitutes the rear clamp. When the third blank has been separated with its lower portion from the fourth blank by the lower separating-blades, the three blanks held by the conveyer are released by the opening of the clamps, the first blank is carried away to the looping mechanism and the conveyer while turning during its subsequent backward movement advances the second blank to the front clamp, the third blank to the intermediate clamp, and then bears against the fourth blank. When the machine is in full operation, there are always three blanks operated upon by the preliminary separating, clamping, and conveying devices, the separation of each blank operated upon being one step in advance of the next following and one blank being completely separated from the pile during each revolution of the conveyer-screw.

The several parts of the preliminary separating and feeding devices are preferably driven as follows: G, Figs. 1, 3, 8, 14, and 15, is a multilated gear-pinion mounted loosely on the conveyer-shaft between the standards $A^3$ and $A^4$, said shaft being free to slide lengthwise in the hub of the pinion, but compelled to turn therewith by means of a pin $g$ on the shaft engaging with slots $g'$ in the supporting hub or sleeve of the gear-pinion, as represented in Fig. 3. This pinion engages with the upper portion of the driving-wheel $d^{10}$, diametrically opposite the lower mutilated gear-pinion $d^{15}$, and is of the same size and construction. During each rotation of the driving-wheel $d^{10}$ its shoulder $d^{16}$ engages with the arm $d^{17}$ of the lower gear-pinion $d^{15}$ and throws the same into gear, and after the teeth of the driving-wheel have cleared the lower pinion the shoulder of the driving-wheel engages with the arm $g^2$ of the upper pinion and throws the latter into gear with the driving-wheel. This operation is repeated during each rotation of the latter and produces alternate rotation of the separating-blades and the conveyer-screw.

$g^3$ is a longitudinal reciprocating cross-head which slides with one end on the counter-shaft and is secured with its opposite end to a sleeve $g^4$, which slides on the conveyer-shaft. The backward movement of the cross-head is produced by springs $g^5$, Figs. 1, 6, and 8, and is limited by the sleeve $g^4$, engaging with a collar $g^6$ on the conveyer-shaft, which collar in turn engages with the standard $A^4$. The forward movement of the cross-head is produced by a rock-lever $g^7$, pivotally connecting said sleeve with the standard $A^4$, and a cam $g^8$, mounted on the counter-shaft and engaging with a roller on said rock arm, Figs. 1, 3, 8, and 13. The rear end of the finger-shaft $f'$ is journaled in a bearing on the cross-head and provided on opposite sides of this bearing with collars or shoulders $g^9$, whereby the finger-shaft is permitted to turn in this bearing, but compelled to move lengthwise with the cross-head.

$g^{10}$ is a collar or shoulder arranged on the conveyer-shaft and separated by an intervening or dead space from the front end of the sleeve of the cross-head when the latter is in its rearmost position, thereby producing a slack connection between the cross-head and conveyer-shaft, whereby the finger-shaft is moved forwardly independent of the conveyer until the separating-finger has been pressed against the rear jaw of the conveyer, after which the cross-head sleeve strikes the shoulder $g^{10}$ of the conveyer-shaft and moves the conveyer forward, together with the separating-finger. The forward rotary movement of the separating-finger for engaging the same between the leaves of a blank is produced by a cam $g^{11}$, arranged on the counter-shaft and engaging with a roller on the end of a rock-arm $g^{12}$, secured to the finger-shaft, the face of said cam being of sufficient width to permit of the necessary longitudinal movement of the rock-arm with the finger-shaft. The backward-turning movement of the finger-shaft is produced by a spring $g^{13}$, secured with its ends to an arm $g^{14}$ on the finger-shaft and a stationary part of the machine, as shown in Figs. 1 and 18.

H, Figs. 1, 8, 18, 22, and 31, is an elbow-lever whereby the sliding clamping-rod in the front end of the conveyer-shaft is operated and which is pivoted on the adjacent portion of the frame. This lever is preferably double its full length and provided in the end of its upwardly-projecting arms $h$ with slots $h'$, which receive pins $h^2$, projecting from opposite sides of a swivel-collar $h^3$, Fig. 31. The latter is mounted loosely on the front end of the clamping-rod and confined by a shoulder $h^4$ and screw-nut $h^5$, arranged on the rod and bearing, respectively, against opposite sides of the collar, whereby the clamping-rod is compelled to move back and forth with the elbow-lever, but is free to turn independent thereof. The elbow-lever is turned for moving the clamping-rod backwardly for clamping the blanks by a spring $h^6$, which is connected at one end to the frame and with its opposite end to a pull-rod $h^7$, connected with the lower horizontal arm $h^8$ of the elbow-lever, Figs. 18 and 22. The position of the elbow-lever for opening the front and intermediate clamps is controlled by a cam $h^9$, mounted on the main shaft and engaging with a roller or projection $h^{10}$ on the pull-rod $h^7$. While the blank-conveyer is in its rearmost position, with its rear jaw pressing against the foremost blank of the solid pile, the clamping-rod and its jaws $f^2 f^3$ are held in their foremost position by the cam $h^9$. When the blank-conveyer begins its forward movement, the cam $h^9$ releases the elbow-lever and permits the same to be turned by the spring $h^6$ for moving the jaws of the clamping-rod $f^4$ backwardly against the front and intermediate jaws of the conveyer, after which the jaws of the clamping-rod are moved forwardly again to the end of the forward movement against the pull of the spring $h^6$ by the conveyer, whereby the blanks are firmly held by the front and intermediate clamps. Before the conveyer begins its backward movement the salient part of the cam $h^9$ engages with the roller $h^{10}$ of the pull-rod and holds the clamping-rod $f^4$ and its jaws against backward movement while the conveyer effects its entire backward movement, thereby releasing the blanks from the front and intermediate clamps.

After each blank in the feed-trough has been completely separated from the pile the blank is delivered to a carrier, which rotates intermittently about a vertical axis and which presents the lowermost corner of the blank to the devices which attach a hanger or loop to the same. This carrier is constructed as follows: I, Figs. 1, 6, 8, 34, and 55, represents a supplemental frame mounted on the front portion of the main frame in front of the delivery end of the feed-trough and consisting of a lower supporting-ring $i$, a lower supporting-plate $i'$, arranged above said ring, an intermediate supporting-plate $i^2$, arranged above the lower supporting-plate, an upper supporting-plate $i^3$, arranged above the intermediate supporting-plate, and vertical posts or members $i^4$, connecting the supporting ring and plates with each other and with the main frame.

J, Figs. 34, 35, 36, and 44 represents a carrier wheel or drum to which is imparted an intermittent horizontal rotary motion in the direction of the arrow, Figs. 36 and 42. This drum is arranged between the lower and intermediate supporting-plates of the supplemental frame with its axis vertically and with its receiving portion opposite the delivery end of the feed-trough. During the forward movement of the blank-conveyer the lower portion of the foremost blank is carried against the drum and also wrapped around the same by a front wrapping-screw $j$, which wraps the advancing portion of the blank around the drum, and two rear wrapping-screws $j'$ $j^2$, which wrap the trailing portion of the blank around the drum, as shown in Fig. 39. The front wrapping-screw is mounted on the front end of the trough-shaft $b^2$, so as to turn in a vertical plane therewith, and has preferably the form of a concave conoid, the curved side of which is substantially concentric with the carrier-drum, as represented in Figs. 6 and 39. The front end $j^3$ of this conoidal screw enters the gap between the first and second blank in the feed-trough, and in turning with the separating-blades gradually wraps the advancing end of the blank around the drum. The lower rear wrapping-screw $j'$ is mounted on the rear end of the feed-trough shaft $b^5$ and engages with the rear portion of the blank adjacent to its lower corner and wraps the same around the drum. The upper rear wrapping-screw engages with the central rear portion of the blank and wraps the same around the drum. In order to avoid kinking the rear middle portion of the blank while it is being wrapped around the drum, the upper rear wrapping-screw is turned in a direction opposite to that of the lower rear wrapping-screw. This is accomplished by a reversely-rotating shaft $j^4$, which carries the upper rear wrapping-screw at its front end and is provided at its rear end with a crank $j^5$, which is connected with the bifurcated connecting rod or yoke $d^7$, whereby the feed-trough shafts are operated. The upper rear screw-shaft $j^4$ is preferably journaled in the feed-trough shaft $b^6$, which latter is made hollow for this purpose, as shown in Fig. 10. This manner of driving the wrapping-screws causes the latter to turn and rest at the same time as the separating-blades.

J' is a curved guide which is secured to the upper supporting-plate $i^3$ and which bears against the inner side of the blanks opposite the front wrapping-screw $j$.

The carrier-drum is journaled on a hollow arbor or bushing $j^6$, Fig. 34, connecting the central portions of the lower and intermediate supporting-plates, and is provided on its periphery with a suitable number of clamps, eight being shown, whereby the blanks are successively seized and held on the carrier-drum. Each of these clamps consists of a stationary outer jaw $j^7$ and a movable inner jaw $j^8$, having a radial movement toward and from the stationary jaw. Each of the outer jaws is curved substantially concentric with the drum and is arranged at a sufficient distance from the latter to permit a blank to pass into the space between the outer jaw and the drum. The front end of the outer jaw is free, while its rear end is secured to the drum.

When the blank-conveyer has carried the foremost blank in the feed-trough against the drum, the latter rotates one-eighth of a turn and carries one of its outer clamping-jaws behind or around the lower portion of the foremost blank and then stops, after which the blank-conveyer E moves backwardly and disengages itself from the foremost blank. Before the drum begins its next forward movement its inner clamping-jaw opposite the feed-trough is pushed out and clamps the foremost blank against the opposing outer jaw, so that during the subsequent forward movement of the drum this blank is carried laterally and forwardly away from the pile to the extent of one-eighth of a turn of the drum. In the meantime the blank-conveyer E has carried the next following blank forwardly, so that the next following outer clamping-jaw passes behind the following blank preparatory to clamping the same. The lower edge of each outer jaw is horizontal, while its upper edge rises from the front end to the rear end of the jaw, which gives the jaw a tapering or pointed form, whereby the same is able to enter more freely into the gap behind the first blank. The inclined upper end also aids in separating the first blank from the second and carrying the same against the drum.

Each of the blanks is carried intermittently with its back or folded side foremost from the receiving side of the drum one-half way round the drum to the delivery side thereof, where the clamp is opened and the blank is discharged. During this half-rotation of the drum the blank is successively presented to the perforating, threading, and knotting mechanisms. This intermittent rotary movement of the drum and the closing and opening of its clamps are effected by the following means: K, Figs. 6, 34, 35, and 36, is a vertical driving-shaft which is journaled with its central portion in the hollow arbor and with its upper end in a bearing formed in the upper horizontal supporting-plate $i^3$. The vertical driving-shaft is driven from the main shaft and at the same speed as the latter by a pair of bevel gear-wheels $k'$ $k^2$, secured, respectively, to the front end of the main shaft and the lower end of the vertical shaft.

$k^3$, Figs. 34 and 35, is a vertical counter-shaft which is journaled with its upper and lower ends in bearings arranged, respectively, on the upper and intermediate supporting-plates. The lower end of the vertical counter-shaft is provided with a gear-pinion $k^4$, which meshes with a gear-wheel $k^5$, secured to the upper end of the hub of the carrier-drum, the relative size of the pinion and gear-wheel being such that one complete turn of the pinion produces one-eighth of a rotation of the carrier-drum. An intermittent rotary motion is imparted to the carrier-drum by a horizontal driving-wheel $k^6$, Figs. 6, 7, 8, 19, and 34, secured to the upper portion of the vertical driving-shaft and provided on its periphery with a segmental row of teeth $k^7$ and a plain convex portion $k^8$, which are adapted to engage successively with the teeth $k^9$ and the concave portion $k^{10}$ of a mutilated gear-pinion $k^{11}$, secured to the upper portion of the vertical counter-shaft. The driving-wheel is provided with a shoulder $k^{12}$, Fig. 6, which is adapted to engage with an arm $k^{13}$ on the gear-pinion $k^{11}$ and start the same gradually and in correct register with the teeth of the driving-wheel in the same manner in which the gear-pinions $d^{15}$ and G of the crank-shaft $d^5$ and conveyer-shaft $e$ are geared with the driving-wheel $d^{10}$ on the horizontal counter-shaft D'.

The timing of the stop-gearing connecting the vertical driving-shaft with the vertical counter-shaft is such that during each rotation of the vertical driving-shaft the counter-shaft makes one rotation, which, however, is produced while the driving-shaft makes one-quarter of a rotation, the counter-shaft then remaining at rest during the remaining three-quarters of the rotation of the driving-shaft, whereby the carrying-drum is turned intermittently one-eighth of a rotation during each complete turn of the main shaft.

Each of the inner movable jaws of the drum is mounted on the outer end of a radially-movable carriage $l$, Figs. 34, 36, 44, and 47, which projects through an opening in the rim of the carrier-drum and is guided in a way $l'$ on the under side of the web of the drum. The carriage is preferably bifurcated and is yieldingly held in its retracted or inner position by a spring $l^2$, mounted on the carriage and bearing against the inner side of the rim of the drum.

L is a rotary cam-disk whereby the inner jaws are moved outwardly for clamping the blanks and which is journaled on the lower portion of the hub of the drum, as represented in Figs. 34, 44, and 67. The face of this cam-disk engages with rollers $l^3$ on the jaw-carriages and is provided with a short outwardly-throwing cam portion $l^4$, adjacent to the receiving portion of the drum, a salient concentric portion $l^5$ following the outwardly-throwing cam portion and extending around the front half of the cam-disk, an inwardly-throwing cam portion $l^6$ following the salient concentric portion and arranged adjacent to the delivery portion of the drum, and a depressed or receding concentric portion $l^7$ following the inwardly-throwing cam portion and extending half-way around the rear side of the cam-disk, as represented in Fig. 36.

Each of the clamp-carriages during one rotation of the drum engages its roller with the outwardly-throwing cam portion $l^4$ of the cam-disk and is lifted upon the salient concentric portion $l^5$ thereof, whereby the foremost blank in the feed-trough is clamped and held while the drum makes the front half of its rotation, after which the roller of the clamp-carriage rides down the inwardly-throwing cam portion $l^6$ onto the depressed concentric portion $l^7$, whereby the clamp is opened, the blank is released, and the clamp is held open while moving around the rear half of the drum. Before the drum begins each intermittent movement the cam-disk is turned backwardly in the direction of the arrow, Fig. 36, sufficiently to close the receiving-clamp upon the foremost blank in the feed-trough, and after the drum has turned forward sufficiently to bring the roller of the clamp-carriage beyond the reach of the outwardly-throwing portion the cam-disk is again turned forwardly. By clamping the blank before the drum begins its forward movement displacement of the blank on the drum is prevented. While a new blank is being clamped on the drum by the backward movement of the cam-disk the clamp on the diametrically opposite side of the drum is opened and releases its blank, but the clamps on the front side of the drum remain unaffected, because their rollers remain on the salient concentric portion of the cam-disk.

$l^8$ is a vertical rock-shaft whereby the cam-disk is oscillated for closing and opening the drum-clamps and which is journaled with its upper end in a bearing in the lower supporting-plate and with its lower end in a bearing formed in a hanger $l^9$, depending from said plate, as represented in Figs. 36, 37, and 67. This rock-shaft is provided above the lower supporting-plate with a rock-arm $l^{10}$, having a pin which engages with a radial slot $l^{11}$ in the cam-disk.

$l^{12}$ is a rock-arm secured to the vertical rock-shaft $l^8$ below the lower supporting-plate and provided with a roller which engages with a cam $l^{13}$, secured to the vertical driving-shaft K. The backward movement of the cam-disk L is produced by the salient portion of the cam $l^{13}$ engaging with the lower rock-arm of the rock-shaft $l^8$ and the forward movement of the cam-disk is arrested by the roller on the lower rock-arm $l^{12}$ engaging with the receding portion of the cam $l^{13}$.

While the blanks are clamped on the drum the lowermost corners of the blanks project downwardly below the drum and its jaws, and each blank stands obliquely and laps over the preceding blank, as shown in Figs. 1 and 39, so that they are compactly arranged around the drum while each lower corner is sufficiently exposed for performing the operations of perforating and threading the blank. This overlapping arrangement results from transferring the blanks in an oblique position from the feed-trough to the drum. After leaving the front wrapping-screw the blanks are guided toward the delivery side of the drum by a curved guide $l^{14}$, Figs. 1, 6, 11, and 39, arranged in front of the central portion of the blanks and supported at one end on the shaft $b^2$ and at its opposite end on the supplementary frame.

After the foremost blank in the feed-trough has been clamped against the drum the latter moves forwardly one-eighth of a turn and then stops with the lower corner of said blank arranged in line with the punch, which perforates the lower corner of the blank and which is constructed as follows: M, Figs. 1, 42, and 45, represents a perforating-die arranged outside of the path of blanks and adjacent to the place where the lower corner of the blank stops to be perforated. This die is separated a sufficient distance from the drum to permit the blank to pass between the die and the drum and is supported at its lower end by a bracket $m$, which is secured to the lower supporting-plate $i'$ and extends outwardly below the path of the blanks.

$m'$ represents a radially-movable punch which is normally arranged inside of the path of the blanks and which is adapted to move outwardly against the die and perforate the blank which is in place at this time between the punch and die. The front end of the punch is guided in an opening in the bracket $m$ and is secured with its rear or inner end to a radially-movable slide or holder $m^2$, which is guided in a way $m^3$ in the lower supporting-plate.

$m^4$ is a vertical rock-shaft whereby the punch is operated and which is journaled in a bearing in the lower supporting-plate. This rock-shaft is provided above the lower supporting-plate with a gear-segment $M'$, which meshes with a gear-rack $m^5$ on one side of the punch-slide. The rock-shaft is provided below the lower supporting-plate with a rock-arm $m^6$, having a roller at its end which bears against a cam $m^7$ on the vertical driving-shaft. When the salient portion of this cam engages with the rock-arm $m^6$, the rock-shaft and segment are turned so as to project the punch and perforate a blank. The punch is retracted by means of a spring $m^8$, mounted on the lower supporting-plate and connected with the rock-arm $m^6$. The movement of the punch is so timed that it is projected and retracted while the blank in front of the same remains at rest.

After the lower corner of the blank has been perforated the drum is turned another one-eighth of a rotation and stands still with the lower corner of the blank arranged in line with the threading mechanism, which draws the twine or cord through the perforation of the blank and which is constructed as follows:

N N', Figs. 1, 34, 40, 41, 42, 44, and 48, represent two twine-feeding disks which are arranged horizontally one above the other outside of the path of the blanks and adjacent to the place where the perforated corner of the blank stops temporarily. The upper disk is secured to the upper end of a vertical spindle $n$ and is provided on the under side of its marginal portion with an annular gripping-face $n'$. The spindle is journaled in a bearing formed in a standard $n^2$, which is mounted on the front portion of the supporting-ring $i$, and the spindle is rotated constantly in the direction of the arrow, Fig. 34, by a train of gear-wheels $n^3 n^4 n^5 n^6$, mounted, respectively, on the vertical driving-shaft, the lower portion of the standard $n^2$, and the lower portion of the feed-spindle $n$. The lower feeding-disk N' is provided on the upper side of its marginal portion with an annular gripping-face $n^7$, which stands opposite the gripping-face of the upper disk. The lower feed-disk is journaled on a bushing or arbor $n^8$, formed on the standard around the upper portion of the feed-spindle, and has its axis arranged slightly at an angle to the axis of the upper feed-disk, so that one portion of the lower disk is higher than the remaining portion of the disk and bears only with a portion of its gripping-face against the gripping-face of the upper disk, thereby causing the receiving side of the gripping-disks to converge toward the gripping-point and the discharge side of the disks to diverge from the gripping-point, as represented in Figs. 34, 44, and 48. The inclination of the lower feed-disk is such that the contact between the gripping-faces of the disks takes place on the inner portion of the disks, as represented in Figs. 34, 40, and 44. The feed-spindle is pressed downwardly for holding the inner portions of the gripping-faces of the feed-disks yieldingly in engagement with each other by a spring $n^9$, which surrounds the spindle and bears with its ends against a shoulder on the standard $n^2$ and on the upper side of the gear-wheel $n^6$ on the spindle, as represented in Fig. 34. The lower feed-disk is driven from the upper feed-disk by vertical pins $n^{10}$, arranged on the under side of the upper feed-disk and engaging loosely with recesses $n^{11}$ in the upper side of the lower feed-disk, as represented in Figs. 42, 44, and 51.

$n^{12}$ is an annular flange which is formed on the under side of the upper feed-disk within its gripping-face and engaging with an annular groove formed in the upper side of the lower feed-disk within the gripping-face thereof, and which serves as a guard whereby the twine is held in place between the gripping-faces of the disks.

The twine unwinds from a horizontal spool $n^{13}$, Figs. 1 and 11, mounted on the front portion of the main frame below the drum, and passes thence upwardly through a twine-guide $n^{14}$, arranged on the main frame in front of the feed-disks, and thence around the receiving side of the guard-flange and between the gripping-faces of the disks to the inner portions thereof, where the end of the twine is clamped between the abutting portions of the gripping-faces. Upon turning the spindle this movement is transmitted by the pins from the upper to the lower feed-disk, whereby all portions of the gripping-face of the lower disk are rolled successively into engagement with the gripping-face of the upper disk, and the twine is fed forward by the feed-disks, which roll in engagement with the opposite sides of the twine. The slot in the twine-guide through which the twine passes is preferably so narrow that a knot or enlargement in the twine cannot pass through the same, thereby arresting the forward feed of the twine and preventing imperfect work and possible injury to the delicate parts of the machine.

$n^{15}$, Figs. 42, 48, and 51, is a notch or recess formed partly in the edge of the upper feed-disk and partly in the edge of the lower feed-disk. This notch stands opposite the perforations of the blank when the latter comes to a standstill before the threading device and forms a clear space around the twine at the point where the twine is removed from the feed-disks and drawn through the perforations of the blank by the radially-movable threading-needle $o$, which is provided at its outer end with a hook $o'$. This needle stands with its hook on the inner side of the path of the blank, while the latter is carried forward by the drum and is in line with the perforation thereof when the blank stands still before the needle. The latter is guided with its outer portion or free end in an opening formed in a guide and clamping block $o^2$, which is secured to the outer side of the lower supporting-plate and is secured with its inner end to a cylindrical holder $o^3$, which is guided in a cylindrical way $o^4$ in the lower supporting-plate, as represented in Figs. 34, 42, 44, and 47. After the blank has been shifted so that its perforation stands opposite the needle the latter is moved outwardly with its hook uppermost through the perforation of the blank and into the recess of the feeding-disks. During the last portion of the outward movement of the needle the inclined front side of its hook engages with the under side of the twine, which crosses the recess of the feeding-disks, as represented in Fig. 51, and deflects the same upwardly, and after the hook has passed the twine the latter drops down into its normal position in front of the hook, as represented in Fig. 52. When the hook of the needle is in the recess of the feeding-disks, a considerable portion of twine has previously been fed off by the feed-disks and hangs loosely on the delivery side of the feed-disks, as represented in Fig. 42. The twine is grasped by those portions of the gripping-faces on the disks which are on opposite sides of its recess, the grip of the portions of the faces on the rear side of the recess being stronger than the portions of the gripping-faces on the front side of the recess.

During the subsequent backward or inward movement of the needle its hook engages with the twine which crosses the feed-disk recess and disengages the loose front portion of the twine from engagement with those portions of the gripping-faces on the front side of the recess and then pulls the loose front portion of the twine through the perforation of the blank. After the needle is withdrawn from the perforation of the blank it continues its backward movement until its hook has receded into the opening of the clamping-block $o^2$, as represented in Fig. 43, in which position the end of the twine is clamped lightly between the needle-hook and the adjacent portion of the clamping-block. After the needle has receded to its innermost position and clamped the end of the twine the blank is moved forward another one-eighth of a rotation and the twine is drawn into the form of a loop or bight, as represented in Fig. 43, the twine for this purpose being supplied by the feed-disks, which pay the twine out continuously. When the hook engages with the twine while the latter is held by the feed-disks, the portions of twine on opposite sides of the hook are horizontally in line, as represented in full lines, Fig. 53, and if the twine were held in this position by the hook while the blank is moving forward and forming a loop in the twine the front end of the twine would be liable to creep over the top of the hook, as represented in dotted lines, Fig. 53, and disengage itself from the same. In order to obviate this difficulty, the needle, after its hook has disengaged the twine from the feed-disks, is turned one-quarter, so that its hook faces rearwardly, as represented in Figs. 42 and 54, whereby the dangling free end of the twine is carried upwardly and the main portion of the twine is carried downwardly, in which position the twine cannot creep over the hook and disengage itself.

$o^5$, Figs. 40, 41, and 42, is a horizontally-reciprocating carriage whereby the threading-needle is moved back and forth and which is guided on the upper portion of the standard $n^2$, below the lower supporting-plate. The inner portion of this slide is provided with a bearing $o^6$, which projects upwardly through an opening in the bottom of the lower supporting-plate and in which the front end of the needle-holder is journaled, so as to be capable of turning independently of the carriage, but compelled to move lengthwise with the carriage.

$o^7$, Figs. 40 and 41, is an elbow-lever whereby the needle-shifting carriage is operated and which is pivoted on the front side of the standard $n^2$, so as to turn in a vertical plane. The upper arm of this lever engages with a notch or recess $o^8$ in the outer end of the needle-carriage, while its lower arm is provided with a roller engaging with a horizontally-rotating cam $o^9$. When the receding portion of the needle-cam engages with the elbow-lever $o^7$, the latter is permitted to be turned in the direction of the arrow, Fig. 40, by a spring $o^{10}$, whereby the needle is moved outwardly through the perforation of the blank and into engagement with the twine in the twine-feeding disks. When the salient portion of this cam engages with the elbow-lever $o^7$, the needle, together with its holder and carriage, is moved inwardly, so as to carry the twine through the perforation of the blank and clamp its end against the clamping-block.

The spring which moves the needle outwardly is preferably mounted on the pivot of the elbow-lever $o^7$ and connected with its ends to said lever and the adjacent standard. The needle-cam $o^9$ is secured to the upper end of a hollow spindle $o^{11}$, which is journaled in the standard $n^2$ and which is rotated continuously at the same speed as the main shaft by the gear-wheel $n^5$, mounted on the lower portion of the spindle, as represented in Fig. 34, and forming one of the train of gear-wheels whereby the twine-feed shaft is operated. The oscillating movement of the needle is produced by a stationary pin $o^{12}$, arranged in the bore of the cylindrical guide of the needle-holder and engaging with a cam or spiral slot $o^{13}$ in the side of the needle-holder, as represented in Figs. 44 and 47. During the outward movement of the needle one side of the inclined or spiral slot in its holder engages with the stationary pin, whereby the needle is turned so that its hook is on the upper side of the needle during the last portion of the forward movement of the needle and engages properly with the twine in the feed-disks. During the backward movement of the needle the other side of the inclined slot in its holder engages with the stationary pin, and the needle is turned one-quarter after its hook has engaged with the twine. If a non-perforated blank should be presented to the needle, owing to the punch failing to perform its function, the needle will only be pressed against the inner side of the blank by the spring, which latter is made of such strength that the needle will not be forced through the blank, whereby the needle is prevented from being caught in the blank and injured by the subsequent forward movement of the blank, which injury would be liable to happen if the needle were moved forward positively by a cam and retracted by a spring.

While the blank is moving forward one-eighth of a turn after leaving the threading device the blank passes between a pair of cooperating twine-cutters or blades P P', which are arranged, respectively, on the inner and outer sides of the path of the blank and each of which is provided with a V-shaped cutting edge, as represented in Figs. 42, 43, and 46. The inner stationary cutter P is secured to a bracket $p$, which is mounted on the adjacent portion of the lower supporting-plate, and the outer movable cutter P' is mounted on a rock-arm $p'$, having a horizontally-swinging movement. After the blank has passed beyond the cutters the outer cutter moves past the inner cutter, whereby the overlapping V-shaped cutters together form an eye or guide $p^2$, as shown in Figs. 42 and 46, through which both strands of the loop are drawn by the blank until the latter reaches the end of the respective eighth of a turn, at which time the cutters have closed upon the strands of the loop sufficient to produce a light tension on the twine, but not sufficient to cut the same, and then stand still, thereby holding the twine loop comparatively taut between the cutters and the blank.

As the blank moves forward from the threading device and forms the loop in the twine the blank takes up the slack which has been formed in the twine by the constant feeding of the disks. This slack is fully taken up by the blank after the latter passes the twine-cutters owing to the movement of the blank being faster than that of the feed-disks, and during the continued forward movement of the blank a tension is produced on the loop which causes the front strand of the loop to be pulled out of engagement with the needle-hook owing to the grip of the feed-disks on the rear strand being greater than the grip of the needle-hook on the front strand. As the blank continues its forward movement after having passed the twine-cutters the loose front strand of the loop is carried forward, but still remains with a considerable portion of its length in rear of the cutters when the blank comes to a standstill and the cutters close upon the strands for producing a tension on the loop. When the blank comes to a standstill after having passed the twine-cutters, the knotting mechanism grasps both strands of the loop between the blank and twine-cutter, and during the first portion of the tying operation draws a sufficient portion of both strands through the cutters to form the knot. After the knotting mechanism obtains control of both strands of the loop the outer cutter completes its inward movement and cuts the twine, whereby a remnant of the front strand of the loop is left behind the cutters and the rear strand of the loop is severed from the main or supply portion of the twine, which main portion is now loose and free to be pulled by the threading-needle through the perforation of the next blank. The movable twine-cutter is mounted on the upper end of a vertical rock-shaft $p^3$, which is journaled in bearings on the supporting-ring $i$ and the standard $n^2$ and passes through the hollow spindle $o''$. For moving the outer twine-cutter toward the inner cutter the rock-shaft is turned by a cam $p^4$, Figs. 34 and 38, arranged on the lower end of the feed-spindle $n$ and engaging with a rock-arm $p^5$ on the lower end of the cutter rock-shaft, and the latter is turned in the opposite direction for separating the twine-cutters by a spring $p^6$, surrounding the lower portion of the cutter-shaft and secured with one end to the latter, while its opposite end bears against the lower end of the feed-disk shaft or a stationary part of the machine.

The mechanism whereby the strands of the twine loop are tied together into a knot is constructed as follows: Q Q', Figs. 55 to 66, represent inner and outer knotter-tubes arranged one within the other and provided, respectively, at their upper ends with hook-shaped jaws $q$ $q'$. These tubes are arranged vertically in rear of the stationary twine-cutter and on the inner side of the path of the blanks, and the outer jaw is journaled in the bracket $p$, but is held against vertical movement by a gear-pinion $q^2$, secured to the lower portion of the outer tube Q' and bearing with its upper side against the under side of the bracket $p$ and with its under side against an arm $q^3$, secured to the bracket $p$, Figs. 55 and 56. The inner knotter-tube is capable of sliding vertically in the outer tube, but is compelled to turn therewith by means of keys or lugs $q^4$, formed on the outer side of the inner tube and engaging with longitudinal slots $q^5$ in the outer tube, as represented in Figs. 55, 56, and 58.

$Q^2$, Fig. 55, is a vertically-sliding pusher-rod arranged within the inner knotter-tube and provided at its upper end with a notch or recess $q^6$, forming a fork which is adapted to engage with the twine and push the same against the hooks of the knotter-tubes.

Preparatory to tying a knot in a loop the pusher-rod is depressed so that its fork is arranged below the path of the twine and the knotter-tubes are shifted so that their jaws are arranged side by side and together form practically one hook, whose jaws are arranged on the inner side of the path of the twine and overhang the same. While the blank is moving from the threading to the knotting mechanism the strands of its loop are carried against the outer side of the knotter-jaws and underneath the overhanging portion thereof, as represented in Fig. 59. After the blank comes to a standstill in advance of the knotter-jaws the pusher-rod is moved upwardly, so that its fork engages with the strands of the loop, forces them against the under side of the knotter-jaws, and elevates the front or advancing portion of the loop above the rear or trailing portion of the loop, as represented in Fig. 60. While the pusher-rod is in this elevated position the knotter-tubes are turned in the direction of the arrow, Fig. 61, and its jaws in a closed position are carried underneath the raised front portion of the loop, as represented in this figure. The pusher-rod is now lowered, while the knotter tubes and jaws continue to turn in the same direction and carry the rear portion of the loop underneath the front portion thereof and form a complete sling or turn in the loop, as represented in Fig. 62. As the jaws approach the rear portion of the strands the inner jaw is lowered by depressing the inner tube, and in continuing their forward rotary movement the outer knotter-jaw is carried over the rear portion of the strands and the inner jaw is carried below the rear portion of the strands, as represented in Fig. 63. The inner knotter-tube is now raised and its jaw is moved toward the outer jaw, whereby the rear portions of the strands are clamped between the two knotter-jaws, as represented in Fig. 64, and shortly thereafter the twine-cutters close entirely, thereby severing the loop from the body of the twine and from the remnant. The knotter-tubes are now moved backwardly with the ends of the strands clamped between the jaws until the jaws point forwardly in the direction of the blank, as represented in Fig. 65. The jaws remain momentarily at rest in this position during the first portion of the next forward movement of the blank, whereby the turn in the loop is stripped from the jaws and the ends of the strand are pulled through the turn in the loop, thereby forming a knot, as represented in Fig. 66. The jaws retain hold of the ends of the strands, so that during the continued forward movement of the blank the knot will be drawn tight, and when the pull upon the loop becomes sufficient to overcome the grip of the knotter-jaws the ends of the loop are disengaged from the knotter-jaws, after which the knotter tubes and jaws are returned to the normal position shown in Fig. 59.

The oscillating movement of the knotter-jaws is produced by a gear-segment $q^7$ meshing with the pinion of the outer knotter-tube and mounted on a rock-arm $q^8$, which is pivoted to the under side of the lower supporting-plate. $q^9$, Fig. 37, is a cam whereby the rock-arm $q^8$ is turned for moving the knotter-jaws forwardly and which is mounted on the vertical driving-shaft and engages with a roller on the rock-arm $q^8$. The backward movement of the knotter-jaws is produced by a spring $q^{10}$, secured with its ends to the rock-arm $q^8$ and the lower supporting-plate.

$q^{11}$ is a horizontal connecting-bar which is pivotally connected at its outer end with the lower end of the pusher-rod $q^2$ and which is hung by links $q^{12}$ from a horizontal rock-lever $q^{13}$, whereby the pusher-rod is actuated. This rock-lever is pivoted with its inner end to the lower portion of the hanger $l^9$, Figs. 55 and 67, and is raised and lowered by a cam $q^{14}$, which is secured to the vertical driving-shaft and which engages with a roller on the horizontal rock-lever $q^{13}$. The inner knotter-tube extends below the outer knotter-tube and is provided on its lower portion with a stop-collar $q^{14}$, which is adapted to bear with its upper side against the lower end of the outer tube and thereby limit the upward movement of the inner tube.

$q^{15}$ is a lifting-lever which is connected with the lower portion of the inner knotter-tube, and $q^{16}$ is a spring whereby this lever is pressed upwardly for holding the inner knotter-tube yieldingly in its elevated position. The lifting-lever is pivoted at its inner end to one of the links $q^{12}$ and is adjustably connected with the inner knotter-tube by passing the lower externally-screw-threaded portion of the inner tube through the lever and applying stop screw-nuts $q^{17}$ $q^{18}$ to the inner tube above and below the lifting-lever, as shown in Fig. 55.

$q^{19}$ is a vertical rod which bears with its upper end against the under side of the outer portion of the lifting-lever and is guided with its lower end in an arm $q^{20}$, secured to the supporting-ring $i$. The spring $q^{16}$ surrounds this rod and bears with its lower end against the arm $q^{20}$ and with its upper end against a collar $q^{21}$ on the guide-rod.

$q^{22}$ is a collar which slides on the inner knotter-tube between the stop-collar $q^{14}$ and the upper stop-nut $q^{17}$ and which is pivotally connected with the outer end of the rock-lever $q^{13}$ by pins $q^{23}$, arranged on opposite sides of the sliding collar and engaging with slots $q^{24}$ in the bifurcated outer end of the rock-lever $q^{13}$, as represented in Fig. 57.

During the first portion of the rotary movement of the cam $q^{14}$ it raises the rock-lever $q^{13}$ from the normal position shown in Fig. 55 and the pusher-rod connected therewith just after the loop of the blank has been carried against the knotter jaws or hooks, whereby the pusher-rod forms the upward bend in the front portion of the loop to permit the jaws, which now begin to turn forwardly, to carry the rear portion of the loop under the front portion thereof. During the last portion of the forward rotary movement of the knotter-jaws the cam $q^{14}$ depresses the rock-lever below its normal position, whereby the pusher-rod is lowered into an inoperative position and the knotter-jaws are separated by reason of the sliding collar $q^{22}$ on the lever engaging with the upper screw-nut $q^{17}$ and depressing the inner knotter-tube, thereby permitting the knotter-jaws to straddle the loop. The cam now raises the rock-lever to its normal position, whereby the spring is permitted to raise the inner knotter-tube and close the knotter-jaws on the loop, in which position the parts are held while the knot is being completed during the subsequent backward rotary movement of the jaws and until the loop of the next blank has been carried across the knotter-jaws. If the blank-carrying drum misses a blank or does not receive one, so that a pair of drum-jaws passes by the looping mechanism without presenting a blank to the same, the constant feed of twine by the feeding-disks is liable to clog the machine and obstruct the parts in their subsequent operations. In order to prevent this occurrence, each pair of drum-jaws is provided with a finger around which the loop is formed when no blank is presented and which carries the loop away from the looping mechanism. $q^{25}$, Figs. 8, 19, 35, 42, 44, and 49, are these clearing-fingers, which are hook-shaped and one of which is secured to each of the inner clamp-jaws $j^3$ of the drum. Each finger is arranged with its hook inside of the place where the blank stands and back of the perforation in the same. If no blank is present, the threading-needle carries the twine across the clearing-hook, and the latter during its forward movement forms a loop in the twine and holds the same while its strands are being tied and takes the place of a blank.

After the knot has been tied on the loop of the blank and the latter is released on the delivery side of the drum the blank is carried obliquely downward and rearward by a delivery or transfer mechanism into a inclined chute, which latter delivers the blanks into a V-shaped delivery or discharge trough. This chute consists of a bottom board R, Figs. 6, 8, 11, 19, 68, 69, and 70, upon which the blanks slide with their lower edge, a front board $r$, extending upwardly from the bottom board on the front side of the path of the blanks, and a bar $r'$, arranged on the inner side of the path of the blanks and secured by bolts $r^2$ $r^2$ to the upper ends of posts $r^3$ $r^4$, which are mounted on the bottom of the chute. The discharge-trough is arranged lengthwise in rear of the chute, drum, and feed-trough and below the same and is composed of a number of longitudinal bars $r^5$, which are connected by V-shaped brackets $r^6$ to the rear portion of the frame, Figs. 6, 8, 11, 12, 16, 19, and 20.

The mechanism whereby the blanks are discharged is constructed as follows: $s\ s\ s'\ s'\ s^2\ s^2\ s^3 s^3$, Figs. 1, 6, 8, 11, 19, 68, 69, 70, 71, and 72, represent an upper and a lower set of discharge-rollers which are arranged adjacent to the delivery portion of the drum and whereby the blanks are carried from the drum to the discharge-trough. The outer rollers $s\ s$ of the upper set are arranged on the outer side of the path of the blanks and mounted on a shaft $s^4$, and the inner rollers $s'\ s'$ of this set are arranged on the inner side of the path of the blanks facing the rollers $s\ s$ and mounted on a shaft $s^5$. The outer rollers $s^2\ s^2$ of the lower set are arranged on the outer side of the path of the blanks below the upper outer rollers and mounted on a shaft $s^6$, and the inner rollers $s^3\ s^3$ of the lower set are arranged on the inner side of the path of the blanks below the upper inner rollers and mounted on a shaft $s^7$. These shafts are arranged parallel with the front and back ends of the blanks as the latter are discharged in an oblique position by the drum, whereby the blanks are propelled by the rollers in a line parallel with the top and bottom edges of the blanks. The shaft $s^5$, supporting the upper inner rollers, is journaled in fixed bearings $s^8$, arranged on the adjacent portion of the stationary frame, and the shaft $s^4$, supporting the upper outer rollers, is journaled in movable bearings $s^9$, whereby the upper outer rollers are carried toward and from the upper inner rollers. As the blank leaves the drum the upper outer rollers stand away from the opposing inner rollers, so as to form a clear space into which the blank can enter freely. After the blank has entered between the upper rollers the outer rollers are moved inwardly and the blank is pressed between the rollers, whereby the latter obtain a firm grip upon the blank and feed the same forward. The movable bearings of the upper outer roller shaft $s^4$ are formed on the upper portion of a rocking frame $s^{10}$, which latter is pivoted at its lower end on the main frame by pivots $s^{11}$, arranged parallel with the upper outer roller shaft. The upper outer rollers are moved outwardly by an outer spring $s^{12}$, secured at one end to the stationary frame and bearing with its other end against the outer side of a downwardly-projecting arm $s^{13}$ on the upper rocking frame $s^{10}$, as represented in Figs. 1, 6, 11, 70, and 71. $s^{14}$ is an inner spring bearing with its free end against the inner side of the arm $s^{13}$ of the rocking frame and secured to the stationary frame, and $s^{15}$ is a connecting-rod which connects the inner spring $s^{14}$ with the rock-arm $l^{12}$ on the lower end of the rock-shaft $l^8$, as represented in Figs. 37, 68, and 70. When the salient portion of the cam $l^{13}$ turns this arm $l^{12}$ for the purpose of turning the cam L and releasing the blank from the clamp on the delivery side of the drum, the inner spring $s^{14}$ is moved outwardly and thus turns the rocking frame $s^{10}$, so that the outer upper rollers grip the blank, and when the rock-arm $l^{12}$ engages with the receding portion of the cam $l^{13}$ the inner spring $s^{14}$ moves inwardly, so as to permit the outer spring $s^{12}$ to separate the upper rollers.

By interposing the inner spring $s^{14}$ between the connecting-rod $s^{15}$ and the rocking frame $s^{10}$ a yielding connection is formed between these parts which enables the upper outer rollers to adjust themselves to the thickness of the blanks, thereby avoiding binding and injury to the parts, which otherwise would be liable to happen if the movable rollers were shifted by positive actuating mechanism.

The shaft $s^4$, supporting the upper outer rollers $s$, extends forwardly beyond the inner upper shaft $s^5$ and is journaled at its front end in a fixed bearing $s^{16}$, arranged on the front portion of the frame, that portion of the outer shaft $s^4$ between its fixed and movable bearings being sufficiently flexible to permit of the necessary movement of the rocking frame. The upper rear end of the outer upper shaft is provided with a gear-pinion $s^{17}$, which meshes with a similar gear-pinion $s^{18}$ on the upper rear end of the upper inner shaft, whereby these shafts are rotated in unison, the teeth of these gear-pinions being sufficiently long so that they will remain in gear in the different positions of the rocking frame. The shaft supporting the outer lower discharge-rollers $s^2$ is journaled in fixed bearings $s^{19}$ on the frame, and the shaft supporting the inner lower rollers $s^3$ is mounted in movable bearings $s^{20}$, which are arranged on a lower rocking frame $s^{21}$, having a movement toward and from the outer lower rollers. This lower frame $s^{21}$ is pivoted on the post $r^3$ and is yieldingly moved toward the outer lower rollers by a spring $s^{22}$ engaging its ends with the post $r^3$ and the lower rocking frame. The movement of the lower inner rollers toward the lower outer rollers is limited by a stop $s^{23}$ on the main frame, against which an arm $s^{24}$ on the lower rocking frame engages, Figs. 8 and 68, and whereby the lower inner rollers are prevented from coming in contact with the outer lower rollers when there is no blank between the same. The lower inner shaft is driven from the lower outer shaft by similar intermeshing gear-pinions $s^{25}$ $s^{26}$, secured, respectively, to these shafts below the path of the blanks and provided with teeth of such length that they remain in gear while the lower rollers are moved toward and from each other. Motion is transmitted to the discharge-rollers for turning them in the direction of the arrows, Figs. 69 and 71, by a belt $s^{27}$, passing around a main driving-pulley $s^{28}$, arranged on the main horizontal shaft in rear of the drum, guide-rollers $s^{29}$ $s^{29}$, arranged on the front portion of the main frame, pulleys $s^{30}$ $s^{31}$, secured, respectively, to the lower front ends of the upper and lower outer shafts, and a tension-roller $s^{32}$, mounted on the frame between the rollers $s^{30}$ $s^{31}$, as shown in Figs. 1, 6, and 68.

T, Figs. 6, 8, 11, 16, and 19, represents a vertical packer-board which reciprocates lengthwise in the discharge-trough and whereby each blank, after being discharged by the chute into the discharge-trough, is moved rearwardly, so as to clear the space in the trough below the chute and to pack the blanks into a pile or bundle. While the blank is being delivered by the chute into the discharge-trough, the packer-board stands on the outer side of the path of the blank. After the latter has dropped into the trough the board moves forwardly, carrying the blank away from the outlet of the chute and backwardly in the discharge-trough, after which the board returns to its normal position outside of the outlet of the chute. The packer-board is mounted on the front end of a bar $t$, which is guided in the bottom of the discharge-trough and connected with its rear end to a rock-lever $t'$, Figs. 6, 8, and 16. This lever is pivoted on the main frame and is turned in the proper direction for moving the packer-board against the blank in the trough by a cam $t^2$, which is mounted on the main driving-shaft and which engages with a roller on the rock-lever. The backward movement of the packer-board is effected by a spring $t^3$, connected with its ends to the rock-lever $t'$ and the discharge-trough, as represented in Fig. 8.

$t^4$, Figs. 6, 8, 9, 19, and 68, is an inclined detent-finger whereby the blanks, after they have been carried away from the outlet of the chute by the packer-board, are prevented from moving backwardly again with the packer and obstructing the chute-outlet. This finger is arranged on the inner side of the discharge-trough and projects slightly into the path of the blank. As the latter is moved rearwardly by the packer-board the inner edge of the blank passes along the inclined under side of the detent-finger and is deflected thereby, and after the blank has passed the detent-finger the deflected portion of the blank straightens out and the abrupt rear side of the finger engages against the blank when the packer is retracted, thereby preventing the blank from moving back with the packer. The detent-finger is preferably formed on the lower end of the chute-bar $r'$ and is made adjustable for different sizes of blanks by the fastening-bolts $r^2$, which pass through a slot $t^5$ in the bar $r'$.

U, Figs. 6, 8, and 20, represents a vertical abutment-board which is removably arranged in the discharge-trough on the inner side of the chute and against which the blanks are packed after they have been delivered by the chute into the discharge-trough. This abutment-board is provided with lugs $u$, which project outwardly between the bars of the discharge-trough.

$u'$ represents a number of abutment-bars which are arranged lengthwise between the longitudinal bars of the discharge-trough and which bear loosely with their front ends against the lugs of the abutment-board, while their rear ends are connected by a cross-head $u^2$. A back pressure is applied to the abutment-board and the blanks behind the same by a weight $u^3$, connected with the cross-head $u^2$ by a cord $u^4$, which latter passes around a roller $u^5$, mounted on the lower portions of the discharge-trough, as shown in Fig. 8.

If a blank becomes caught in the chute or in the mechanism which carries the blanks from the drum to the discharge-trough, the operation of the machine is automatically arrested by a stop mechanism, which is constructed as follows:

V is a main driving-pulley which is so mounted on the rear end of the main driving-shaft as to be capable of a longitudinal and a rotary movement thereon. This pulley is provided on the inner side of its hub with a clutch-collar $v$, which is adapted to be engaged with or disengaged from a clutch-collar $v'$ on the main shaft by moving the pulley lengthwise on the shaft.

$v^2$ is an intermediate coupling-lever which is arranged lengthwise in the main frame and pivoted between the rear portions of the same to a bracket V', Figs. 1 and 12. This lever is provided on its rear arm with a fork $v^3$, which engages with an annular groove in the clutch-collar of the pulley, Figs. 1 and 12.

$v^4$ is a main coupling-lever which forms a forward extension of the intermediate lever and is pivoted at $v^5$ to the main frame and loosely connected at its rear end with the front end of the intermediate lever.

$v^6$ is a spring which connects the front end of the main lever with the main frame, Fig. 1, and exerts a downward pressure on the lever for uncoupling the driving-pulley from the driving-shaft.

W, Figs. 1, 4, 5, 8, and 16, is a vertical catch whereby the coupling-levers are held in a coupled position. This catch is pivoted with its lower end to the front arm of the intermediate coupling-lever and passes with its upper end through an opening which is formed in a bracket $w$, mounted on the main frame. The opening in the bracket is L-shaped, one branch $w'$ being arranged transversely, while the other branch $w^2$ is arranged longitudinally and extends from the front end of the transverse branch toward the rear end of the machine, as shown in Fig. 5. The upper end of the catch is provided with a shoulder $w^3$, which is adapted to engage with a shoulder $w^4$, formed on the under side of the bracket adjacent to the rear side of the transverse branch of the opening in the bracket, as represented in Figs. 4 and 5. The catch is yieldingly held in engagement with the shoulder of the bracket by a spring $w^5$, connecting the same with the main frame, and can be disengaged by hand from the bracket-shoulder by a handle $w^6$, pivoted on the front arm of the main coupling-lever and connected by a rod $w^7$ with the catch, Fig. 1.

$w^8$ is a vertical trip-arm which is adapted to disengage the catch from the shoulder on the bracket and uncouple the driving-clutch. This arm is arranged with its lower end in rear of the upper end of the catch and is so mounted that it is capable of a transverse and a longitudinal oscillating movement. This is preferably accomplished by pivoting the upper end of the trip-arm by a transverse pin $w^9$ to a longitudinal horizontal shaft $w^{10}$, which shaft is journaled with its ends in bearings $w^{11}$ on the main frame. Upon swinging the trip-arm lengthwise of the machine the catch is not disturbed, but when the trip-arm is swung transversely forward it strikes the catch and disengages the same from the bracket, thereby permitting the spring $v^6$ to shift the parts for uncoupling the driving-clutch.

W', Figs. 4, 5, and 16, is a rotary trip-disk mounted on the main shaft and provided with a pin $w^{12}$, which is adapted to engage with the rear side of the trip-arm and swing the same forwardly, so as to disengage the catch from the bracket-shoulder.

$w^{13}$ is a spring which connects the trip-arm with the main frame and which yieldingly holds the trip-arm in the path of the pin on the trip-disk.

$w^{14}$ represents an intermediate rock-lever which is pivoted on the rear portion of the frame and which is connected with its front arm by a rod $w^{15}$ to the trip-arm. The rear arm of the intermediate rock-lever is connected by a rod $w^{16}$ with a main rock-lever X, which is pivoted on the front portion of the main frame. The main rock-lever X is turned in the direction of the arrow, Fig. 6, for permitting the spring $w^{13}$ to pull the trip-arm into the path of the trip-disk pin by means of a cam $x$, Figs. 1, 8, and 18, mounted on the main shaft and engaging with a roller on the main rock-lever X, and the latter is turned in a reverse direction for shifting the trip-arm out of the path of the trip-disk pin $w^{12}$ by a spring $x'$, Figs. 6 and 8, which connects the main rock-lever X with the main frame.

$y$, Figs. 6, 8, 68, and 69, represents a number of feeling-fingers which move horizontally back and forth across the path of the blanks as they are carried by the chute and delivery mechanism from the drum to the discharge-trough and which are adapted to detect any blanks that may be caught in the blank-delivery devices. These fingers are guided in openings formed in a stationary supporting-bar $y'$, which is secured to the post $r^4$ or a part of the frame on the inner side of the chute, as shown in Figs. 68 and 69.

$y^2$ is a reciprocating carrying-bar to which the inner ends of the feeling-fingers are secured and which is connected with the free end of the main rock-lever X by rods $y^3$. The movement of the feeling-fingers is so timed that they are moved forwardly across the path of the blanks after a blank is supposed to have been transferred from the drum to the discharge-trough. If the blank has been properly transferred, the feeling-fingers are moved forwardly across the path of the blanks by the main rock-lever X, and the latter pulls the trip-arm $w^8$ rearwardly, as shown in dotted lines, Fig. 4, so that the pin of the trip-disk cannot strike the trip-arm, thereby preventing uncoupling of the driving mechanism. If a blank becomes caught in the transferring mechanism, the feeling-fingers strike the same and are prevented from moving forwardly across the path of the blanks, thereby preventing the rock-lever X from pulling the trip-arm $w^8$ out of the path of the trip-disk pin $w^{12}$, so that the latter during its rotary movement strikes the trip-arm, and this arm in turn strikes the catch W and disengages the same from the bracket, whereby the coupling-levers are liberated and permitted to uncouple the driving mechanism.

The blanks in moving through the machine are engaged only on their lower portions, while their upper portions are perfectly free, which enables this machine to operate on blanks of various widths and lengths without necessitating a change in the adjustment of its parts.

I claim as my invention—

1. In a blank-looping machine, the combination with a rotating drum provided on its periphery with blank-holding jaws, of perforating and looping mechanism, substantially as set forth.

2. In a blank-looping machine, the combination with an upright rotating drum provided on its periphery with blank-holding jaws, of perforating and looping mechanism arranged below said drum, substantially as set forth.

3. In a blank-looping machine, the combination with an upright rotating drum provided on its periphery with blank-holding jaws, of a feed-trough opening against the peripheral face of said drum, means whereby the blanks are successively fed from said trough against the drum, and perforating and looping mechanism arranged below said drum, substantially as set forth.

4. In a blank-looping machine, the combination with an upright rotating drum provided on its periphery with blank-holding jaws, of a feed-trough opening against the peripheral face of said drum on one side thereof, means whereby the blanks are successively fed from said trough against the drum, a discharge mechanism arranged on the opposite side of the drum, and perforating and looping mechanism arranged below the drum and between the feed-trough and the discharge mechanism, substantially as set forth.

5. The combination with a blank-carrying drum, of a feed-trough having oblique sides and opening adjacent to the peripheral face of the drum, and means whereby the blanks are successively delivered from the trough against the drum, whereby the blanks are arranged on the drum obliquely, substantially as set forth.

6. The combination with a blank-carrier, of a feed-trough composed of longitudinal rotating shafts, substantially as set forth.

7. The combination with a blank-carrier, of a feed-trough composed of two sets of longitudinal rotating shafts, and means whereby the two sets of shafts are rotated in opposite directions, substantially as set forth.

8. The combination with the two sets of shafts of the feed-trough and the driving-shaft provided with a crank, of a yoke connected with said crank, cranks secured to one set of said shafts and connected with said yoke, a counter-shaft provided with a crank which is connected with said yoke, and gear-wheels connecting said counter-shaft with the other set of said shafts and rotating the same in the opposite direction, substantially as set forth.

9. The combination with an open trough in which the pile or stack of blanks is arranged, of a follower extending outwardly beyond the inner faces of said trough, and longitudinal actuating-bars arranged outside of the inner faces of said trough and detachably connected with said follower, substantially as set forth.

10. The combination with the shafts of the feed-trough, of a follower arranged in said trough and having extensions which project beyond the inner faces thereof, and longitudinal actuating-bars arranged outside of the inner faces of said trough-shafts and connected with said follower, substantially as set forth.

11. The combination with a feed-trough which contains the stack or pile of blanks, of a feeding-finger which has a rotary motion in the plane of the blanks and across the feed-trough, whereby said finger enters edgewise between the blanks, and which has a subsequent motion at right angles to the plane of the blank and lengthwise of the feed-trough whereby the blank in front of the finger is moved forward in the feed-trough, substantially as set forth.

12. The combination with a feed-trough which contains the stack or pile of blanks, of a separating-finger which enters the trough and engages with one of the blanks and moves the same forwardly and a conveyer-screw against which the blank is moved by said finger and which continues the movement of the blank, substantially as set forth.

13. The combination with a feed-trough which contains the stack or pile of blanks, of a separating-finger which enters the trough and engages with one of the blanks and moves the same forwardly, a conveyer-screw against which the blank is moved by said finger and which continues the movement of the blank and clamping-jaws whereby the blanks are pressed against the conveyer-screw, substantially as set forth.

14. The combination with the feed-trough containing the stack or pile of blanks, of a conveyer-screw, clamping-jaws, and a telescopic actuating-shaft upon the parts of which said screw and jaws are respectively mounted, substantially as set forth.

15. The combination with a feed-trough containing the stack or pile of blanks, of a separating-finger engaging one of the blanks and moving the same forwardly in the trough, a conveyer-screw whereby the forward movement of such blank is continued, and a series of rotary separating-blades which continue and complete the separation of the blanks, substantially as set forth.

16. The combination with a feed-trough composed of longitudinal rotary shafts, of separating-blades mounted on said shafts, substantially as set forth.

17. The combination with the blank-carrying drum, of a feed-trough facing the peripheral portion of the drum, means whereby the blanks are successively fed against the peripheral portion of the drum, and a wrapping device whereby the projecting portion of the blanks is laid against the peripheral portion of the drum, substantially as set forth.

18. The combination with a blank-carrying drum and means whereby the blanks are successively fed against the peripheral face of the drum, of a wrapping-screw having a concave or conoidal face corresponding with the peripheral face of the drum, whereby the projecting portion of the blank is laid against the face of the drum and the blank is guided in moving with the drum along the concave face of said screw, substantially as set forth.

19. The combination with the rotating blank-carrying drum and mechanism whereby the blanks are fed successively and obliquely against the peripheral face of said drum, of a perforator arranged below said drum and adapted to perforate the exposed corner of the blank carried on the drum, substantially as set forth.

20. The combination with the rotating blank-carrying drum and mechanism whereby the blanks are fed successively and obliquely against the peripheral face of said drum, of a threading mechanism arranged below said drum and adapted to draw the twine through the perforation in the exposed corner of the blank carried on the drum, substantially as set forth.

21. The combination with the rotating blank-carrying drum and mechanism whereby the blanks are fed successively and obliquely against the peripheral face of said drum, of a perforator arranged below said drum and adapted to perforate the exposed corner of the blank carried on the drum, and a threading mechanism arranged below said drum and in rear of said perforator, substantially as set forth.

22. The combination with the blank-carrier and the threading-needle, of twine-feeding disks arranged at an angle to each other, substantially as set forth.

23. The combination with the blank-carrier and the threading-needle, of twine-feeding disks which are arranged at an angle to each other and one of which is provided with a peripheral guard-flange in the space between the disks, substantially as set forth.

24. The combination with the blank-carrier and the threading-needle, of twine-feeding disks arranged at an angle to each other and provided with a gap into which the needle enters and across which the twine extends, substantially as set forth.

25. The combination with the blank-carrier, of a threading-needle, twine-feeding disks arranged at an angle to each other, a driving-shaft connected with one of said disks, and coupling-pins whereby the other disk is driven from the disk on said shaft, substantially as set forth.

26. The combination with the blank-carrier and a twine-feeding device, of a threading-needle, mechanism whereby a reciprocating rotating movement is imparted to the needle, and mechanism whereby the needle is given a partial turn backwardly after it has seized the twine, substantially as set forth.

27. The combination with a moving blank-carrier, of a threading mechanism whereby the twine is drawn through the perforation of the blank, a knotting-hook arranged in rear of the threading-needle and past which the twine, drawn through the perforation of the blank, is carried by the movement of the blank-carrier, jaws which are arranged between the needle and hook and mechanism whereby the jaws are caused to impinge upon the twine while the hook is tying the knot, and afterward caused to cut the twine, substantially as set forth.

28. The combination with the knotter-hook, of a pusher-rod whereby the twine is pushed into the bight of the hook, substantially as set forth.

29. The combination with the knotter-hook having a hollow stem, of a pusher-rod arranged within said stem, substantially as set forth.

Witness my hand this 28th day of December, 1896.

CARLOS HOLLY. [L. S.]

Witnesses:
MARK J. TOVELL,
T. F. TRACEY.